United States Patent
Han et al.

(10) Patent No.: US 8,515,472 B2
(45) Date of Patent: Aug. 20, 2013

(54) METHOD FOR TRANSMITTING PHYSICAL LAYER ID INFORMATION

(75) Inventors: Seung Hee Han, Gyeonggi-do (KR);
Yeong Hyeon Kwon, Gyeonggi-do (KR); Dragan Vujcic, Limours (FR);
Dong Cheol Kim, Gyeonggi-do (KR);
Sung Ho Moon, Gyeonggi-do (KR); Jin Sam Kwak, Gyeonggi-do (KR); Min Seok Noh, Gyeonggi-do (KR); Hyun Woo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 12/999,876

(22) PCT Filed: Jun. 18, 2009

(86) PCT No.: PCT/KR2009/003270
§ 371 (c)(1),
(2), (4) Date: Dec. 17, 2010

(87) PCT Pub. No.: WO2009/154410
PCT Pub. Date: Dec. 23, 2009

(65) Prior Publication Data
US 2011/0098070 A1    Apr. 28, 2011

Related U.S. Application Data

(60) Provisional application No. 61/073,368, filed on Jun. 18, 2008, provisional application No. 61/074,139, filed on Jun. 19, 2008, provisional application No. 61/073,770, filed on Jun. 19, 2008.

(30) Foreign Application Priority Data

Aug. 6, 2008    (KR) .................. 10-2008-0077010
Aug. 14, 2008   (KR) .................. 10-2008-0080199

(51) Int. Cl.
*H04B 7/00*   (2006.01)
(52) U.S. Cl.
USPC .......... 455/500; 455/507; 455/432.2; 455/73; 455/435.2; 370/332

(58) Field of Classification Search
USPC .............. 455/158, 158.1, 500, 415, 436, 464, 455/102, 103, 177.1, 226.3, 458, 63.1, 407, 455/437, 452.1, 450, 456.1, 418, 422.1, 502, 455/561, 432.1, 432.2, 435.1, 422, 73; 370/395.3, 342, 498, 324, 336, 241, 321, 370/331, 335, 280, 252, 338, 312, 350, 203, 370/311, 328, 315, 279, 329, 332; 375/260, 375/149, 362, 130, 140, 145, 259, 340, 371; 348/207.99

See application file for complete search history.

(56) References Cited

U.S. PATENT DOCUMENTS

| | | | |
|---|---|---|---|
| 2009/0168727 A1* | 7/2009 | Somasundaram et al. .... | 370/332 |
| 2010/0261472 A1* | 10/2010 | Han et al. .................. | 455/434 |
| 2010/0296429 A1* | 11/2010 | Han et al. .................. | 370/312 |

FOREIGN PATENT DOCUMENTS

| WO | WO 2006/030308 A2 | 3/2006 |
|---|---|---|
| WO | WO 2007/003991 A2 | 1/2007 |

OTHER PUBLICATIONS

Samsung Electronics. LTE Rel.8 Physical Layer. Jun. 24, 2008. Online Publication http://www.slideshare.net/allabout4g/tle-rel-8-physical-layer" http://www.slideshare.net/allab...*

*Primary Examiner* — Tan Trinh
(74) *Attorney, Agent, or Firm* — McKenna Long & Aldridge LLP

(57) ABSTRACT

A method for transmitting IDs of cells of a specific type as physical cell ID information in addition to existing cell ID information is disclosed. For transmission of the physical cell ID information, the number of cell IDs used in transmitting the existing cell ID information on a synchronization channel is increased or a part of existing cell IDs are reserved for transmitting the additional specific-cell ID information. If the number of cell IDs is to be increased, the number of cell ID groups related to a secondary synchronization channel is increased in a manner that removes ambiguity and collision, a cell ID related to a primary synchronization channel is added, which satisfies conjugate symmetry, information is transmitted based on a transmission timing relationship between a primary synchronization code and a secondary synchronization code, or a scrambling scheme is modified. When a part of the existing cell IDs are reserved, conjugate symmetry is also considered in relation to a primary synchronization channel and ambiguity and collision are also considered in relation to a secondary synchronization channel.

2 Claims, 9 Drawing Sheets

FIG. 10

| Cell A | Data | SSS0 | PSS0 |

| Cell B | PSS1 | SSS1 | Data |

FIG. 11

| Cell A | Data | SSS0 | PSS0 |

| Cell B | PSS0 | SSS0 | Data |

METHOD FOR TRANSMITTING PHYSICAL LAYER ID INFORMATION

This application claims the benefit of priority of U.S. Provisional Application No. 61/073,368 filed on Jun. 18, 2008, U.S. Provisional Application No. 61/074,139 filed on Jun. 19, 2008, U.S. Provisional Application No. 61/073,770 filed on Jun. 19, 2008, Korean Patent Application No. 10-2008-0077010 filed on Aug. 6, 2008, Korean Patent Application No. 10-2008-0080199 filed on Aug. 14, 2008 and PCT Application No. PCT/KR2009/003270 filed Jun. 18, 2009, all of which are incorporated by reference in their entirety herein.

BACKGROUND OF THE INVENTION

1. Field of the Invention

The present invention relates to a method for transmitting cell Identifier (ID) information in a wireless communication system, and more particularly, to a method for efficiently transmitting additional cell ID information, while minimizing influence on a legacy system.

2. Discussion of the Related Art

A cell ID identifies a cell covering a specific area within a wireless network. The specific area includes at least one Base Transceiver Station (BTS) or Node B that controls wireless operations within its coverage area and provides connectivity between the network and a Mobile Station (MS) or User Equipment (UE) via an air interface. The BTS or Node B or eNode B is an access point for indoor or/and outdoor coverage.

For home coverage, the access point is known as a femtocell Base Station (BS), a Home Node B (HNB), an evolved Home Node B (eHNB), or a Closed Subscriber Group (CSG) BS which is a smaller cellular base station, typically designed for use in residential or small business environments. For the sake of convenience, such a small BS will be referred to as a 'CSG BS' or 'CSG cell'. However, the specific terms are not limited to a certain meaning.

The CSG BS is connected to an operator's network via broadband connection means such as a Digital Subscriber Line (DSL) or a cable. The CSG cell allows cellular operators to extend indoor service coverage, especially where access would be limited or unavailable.

The most challenging issue at this stage of standardization is to define a cell ID for a UE to identify whether a cell is a CSG cell or a non-CSG cell in an early phase of a cell identification process. This is because some UEs are allowed to access the CSG cell, while others are not.

To be more specific, if only higher-layer ID information is used to identify a CSG cell, a UE cannot interpret the higher-layer ID information until it receives the signal through a lower layer and completes initial cell search. If the interpreted higher-layer ID indicates a CSG cell inaccessible to the UE, the UE has consumed unnecessary power and has experienced time latency.

Accordingly, there exists a need for a technique for reducing the power consumption of a UE and minimizing additional delay overhead in a handover process performed for the UE with non-authorized access to a CSG cell.

SUMMARY OF THE INVENTION

Accordingly, the present invention is directed to a method for transmitting physical-layer ID information that substantially obviates one or more problems due to limitations and disadvantages of the related art.

An object of the present invention is to provide a method for enabling a UE to easily search for and identify a CSG cell during initial cell search.

Another object of the present invention is to provide a more general method for transmitting physical-layer ID information in addition to existing cell ID information as well as searching for a CSG cell.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting additional physical cell ID information by increasing the number of existing cell IDs is provided.

In accordance with one aspect of the present invention, a method for transmitting physical layer cell ID includes transmitting a Primary Synchronization Signal (PSS) and a Secondary Synchronization Signal (SSS), wherein a time relationship corresponding to a transmission order between the PSS and the SSS represents the physical layer cell ID information.

The physical layer cell ID information may represent cell ID information of a serving cell and service property information of the serving cell. the service property information of the serving cell may represent at least one of information indicating whether the serving cell is a Closed Subscriber Group (CSG) cell or a Relay Station (RS) cell, a Multimedia Broadcast Multicast Service (MBMS) indicator, and a hot spot indicator, and the cell ID information of the serving cell may represent a whole or part of an ID of the serving cell.

If the SSS is transmitted after the PSS, physical layer cell ID information corresponds to a CSG cell ID and if the PSS is transmitted after the SSS, physical layer cell ID information corresponds to a non-CSG cell ID may be indicated.

In another aspect of the present invention, a method for transmitting physical layer cell ID information includes scrambling two Secondary Synchronization Channel (S-SCH) signals based on a combination of a first segment and a second segment according to a first type scrambling or a second type scrambling, and transmitting the two scrambled S-SCH signals as two SSCs. The first type scrambling is distinguished from the second type scrambling in accordance with at least one of whether scrambling is performed based on the first segment or the second segment, a combination of PSC-based scrambling sequences multiplied by the SSCs, and a type of scrambling sequences multiplied by the SSCs. The physical cell ID information is represented according to whether the first or second type scrambling is applied.

The physical layer cell ID information may represent at least one of information indicating whether a serving cell is a CSG cell or an RS cell, an MBMS indicator, and a hot spot indicator.

The transmitted two SSCs represent a CSG cell ID If the second type scrambling is applied, and the transmitted two SSCs represent a non-CSG cell ID if the first type scrambling is applied.

The first type scrambling may be to scramble the second segment with a scrambling sequence based on the first segment and the second type scrambling may be to scramble the first segment with a scrambling sequence based on the second segment.

The PSC-based scrambling sequences may include a first PSC-based scrambling sequence and a second PSC-based scrambling sequence. The first type scrambling may be to scramble a first S-SCH signal with the first PSC-based scrambling sequence and a second S-SCH signal with the second PSC-based scrambling sequence and the second type scrambling may be to scramble the first S-SCH signal with the second PSC-based scrambling sequence and the second S-SCH signal with the first PSC-based scrambling sequence.

The second type scrambling may be different from the first type scrambling in at least one of a used PSC-based scrambling sequence, the first segment-based scrambling sequence, and the second segment-based scrambling sequence.

In another aspect of the present invention, a method for transmitting physical layer cell ID information includes performing one of predetermined different phase modulation schemes on two SSCs, and transmitting the phase-modulated two SSCs. The predetermined different phase modulation schemes may be distinguished according to different code values of length 2 multiplied by the two SSCs and physical cell ID information is determined according to the phase modulation applied on the two SSCs.

The predetermined different phase modulation schemes may include a first-type phase modulation and a second-type phase modulation. The first-type phase modulation and the second-type phase modulation may be performed by applying different combinations of first and second codes to the two SSCs in one of Binary Phase Shift Keying (BPSK), Quadrature Phase Shift Keying (QPSK), and M-ary Phase Shift Keying (M-PSK). If the first-type phase modulation scheme is performed, the physical layer cell ID information may indicate a CSG cell and if the second-type phase modulation scheme is performed, the physical layer cell ID information may indicate a non-CSG cell.

The predetermined different phase modulation schemes may include a first-type phase modulation scheme, a second-type phase modulation scheme, and a third-type phase modulation. The first-type phase modulation scheme, the second-type phase modulation scheme, and the third-type phase modulation scheme may be performed by applying different combinations of first and second codes to the two SSCs in one of BPSK, QPSK, and M-PSK. If the first-type phase modulation scheme is performed, the physical layer cell ID information may indicate a CSG cell, if the second-type phase modulation scheme is performed, the physical cell ID information may indicate an RS cell, and the third-type phase modulation scheme is performed, the physical cell ID information may indicate a cell other than the CSG cell or the RS cell.

In another aspect of the present invention, a method for transmitting physical layer cell ID information includes selecting a sequence having one of first to fourth root indexes, and transmitting the selected sequence as a PSC. One of the first to fourth root indexes is set to represent specific-cell ID information other than normal-cell ID information, the first to fourth root indexes are paired into a first pair and a second pair, and a sum of the root indexes in each of the first and second pairs corresponds to a length of the sequence transmitted as the PSC.

The specific-cell ID information may include cell ID information of a serving cell and service property information of the serving cell. The service property information of the serving cell may represent at least one of information indicating whether the serving cell is a CSG cell or an RS cell, an MBMS indicator, and a hot spot indicator, and the cell ID information of the serving cell may represent a whole or part of an ID of the serving cell.

To achieve these objects and other advantages and in accordance with the purpose of the invention, as embodied and broadly described herein, a method for reserving a part of existing cell IDs for transmitting additional physical cell ID information is provided.

In another aspect of the present invention, a method for transmitting physical layer cell ID information includes selecting a sequence having one of first, second and third root indexes, and transmitting the selected sequence as a PSC. One of the first, second and third root indexes is set to represent specific-cell ID information other than normal-cell ID information, a sum of root indexes except for the root index set to represent the specific-cell ID information is equal to a length of the sequence transmitted as the PSC, and a sum of the root index set to represent the specific-cell ID information and one of the other root indexes is not equal to the length of the sequence transmitted as the PSC.

The specific-cell ID information may include cell ID information of a serving cell and service property information of the serving cell. The service property information of the serving cell may include at least one of information indicating whether the serving cell is a CSG cell or an RS cell, an MBMS indicator, and a hot spot indicator, and the cell ID information of the serving cell may include a whole or part of an ID of the serving cell.

In another aspect of the present invention, a method for transmitting physical cell ID information includes selecting a combination of a first index $m_0$ and a second index $m_1$ to indicate a cell group ID, and transmitting two length-M sequences corresponding to the selected first and second index combination $(m_0, m_1)$ as two SSCs. If the selected first and second index combination $(m_0, m_1)$ belongs to a predetermined first group, the two SSCs indicate a CSG cell and if the selected first and second index combination $(m_0, m_1)$ belongs to a predetermined second group, the two SSCs indicate a non-CSG cell. The first group includes a minimum number of identical indexes between combinations $(m_0, m_1)$ and $(m_1, m_0)$ from among all possible combinations of two length-M sequences and includes preselected combinations with a number of combination required for indicating the CSG cell in an ascending order of combination corresponding to a minimum distance between the first and second indexes $m_0$ and $m_1$. If the first group is set in addition to existing combinations $(m_0, m_1)$, cell ID information may be added. If a part of the existing combinations $(m_0, m_1)$ are reserved as the first group, part of existing cell ID information may be reserved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 illustrates a problem that may be caused by using Synchronization Signal (SS) swapping only.

FIG. 11 illustrates collision that may occur when the same PSS-based scrambling code is used for SSSs.

DETAILED DESCRIPTION OF THE INVENTION

Figure 1:
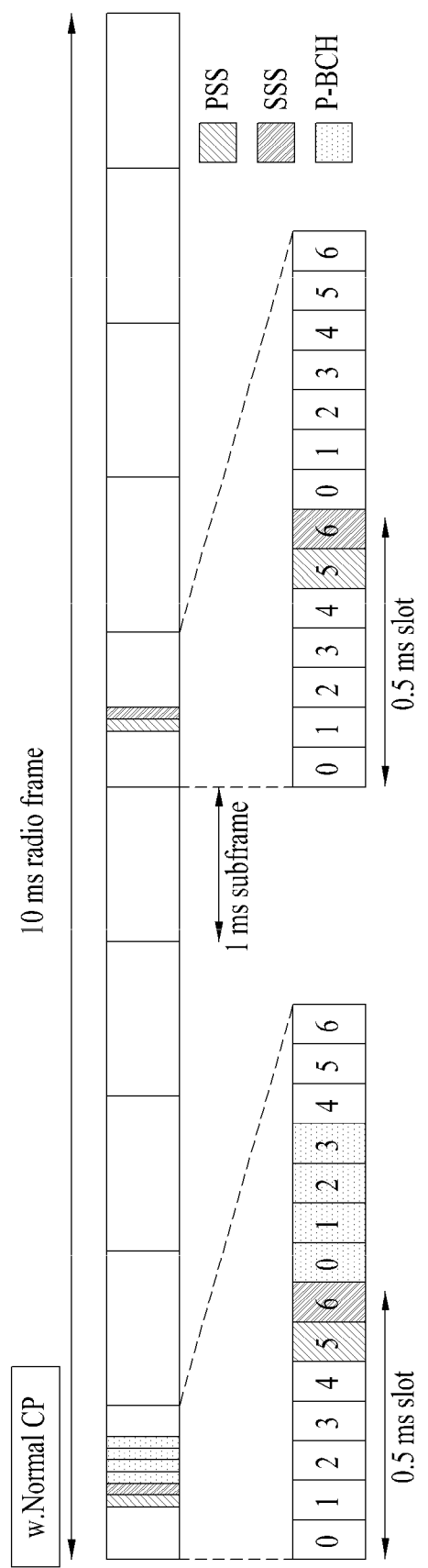
FIG. 1 illustrates an exemplary radio frame structure using a normal Cyclic Prefix (CP).

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

Techniques as set forth herein are applicable to various wireless communication systems. A wireless communication system is deployed over a large area in order to provide various communication services such as voice service and packet service. The techniques are applicable to downlink and uplink. In general, a downlink refers to communication directed from a Base Station (BS) to a User Equipment (UE) and an uplink refers to communication directed from a UE to a BS. In the following description, the term 'BS' is assumed to refer to a fixed station such as a Node B, a Base Transceiver Station (BTS), an access point, etc., communicating with a UE. The term 'UE' generically refers to a mobile or fixed user terminal device such as a Mobile Station (MS), a User Terminal (UT), a Subscriber Station (SS), a wireless device, etc.

The present invention provides a method for enabling a UE to readily search for and identify a Closed Subscriber Group (CSG) cell in an initial cell search stage. For this purpose, a description will first be given of initial cell search in a $3^{rd}$ Generation Partnership Project (3GPP) or 3GPP Long Term Evolution (3GPP LTE) system, followed by a description of a method for searching for and identifying an additional cell, while minimizing influence on a legacy system, specifically a method for enabling a UE to search for and identify a CSG cell.

A 3GPP Wideband Code Division Multiple Access (3GPP-WCDMA) system uses a total of 512 long Pseudo Noise (PN) scrambling codes to distinguish BSs from one another. That is, each BS uses a different long PN scrambling code to scramble its downlink channels.

Upon power-on, a UE acquires system synchronization to an initial cell and the long PN scrambling code ID of the initial cell. This is called cell search. The initial cell is determined according to the location of the UE at the moment of power-on. In general, the initial cell is a cell managed by a BS from which the UE has received the strongest of downlink signals.

To facilitate cell search, the WCDMA system groups the 512 long PN scrambling codes into 64 code groups and uses downlink channels including a Primary Synchronization Channel (P-SCH) and a Secondary Synchronization Channel (S-SCH). A UE acquires slot synchronization using the P-SCH and acquires frame synchronization and a scrambling code group using the S-SCH.

Cell search is typically classified into initial cell search and non-initial cell search. After power-on, the UE performs the initial cell search. The non-initial cell search involves handover or neighbor cell measurement.

In the WCDMA system, the initial cell search is carried out in three steps.

In Step 1, the UE acquires slot synchronization using a Primary Synchronization Signal (PSS) received on a P-SCH. In the WCDMA system, each frame includes 15 slots and each BS transmits a PSS in a frame. The same PSS is used for all of 15 slots and every BS uses the same PSS. The UE acquires slot synchronization using a matched filter for the PSS.

In Step 2, the UE acquires a long PN scrambling code group and frame synchronization using the slot synchronization and a Secondary Synchronization Signal (SSS) received on an S-SCH.

In Step 3, the UE detects a long PN scrambling code ID that identifies the long PN scrambling code of the initial cell based on the frame synchronization and the long PN scrambling code group, using a common pilot channel code correlator. Because 8 long PN scrambling codes are included in each long PN scrambling code group, the UE calculates the correlations of the 8 long PN scrambling codes of its code group and detects the long PN scrambling code ID of the initial cell based on the calculated correlations.

A wireless communication system may operate in Orthogonal Frequency Division Multiplexing (OFDM)/Orthogonal Frequency Division Multiple Access (OFDMA). OFDM uses multiple orthogonal subcarriers, based on the orthogonality between Inverse Fast Fourier Transform (IFFT) and Fast Fourier Transform (FFT). A transmitter IFFT-processes data prior to transmission and a receiver recovers the original data by FFT-processing a received signal. That is, the transmitter uses IFFT to combine multiple subcarriers and the receiver uses the counterpart of IFFT, namely FFT to separate multiple subcarriers from one another.

FIG. 1 illustrates an exemplary radio frame structure using a normal Cyclic Prefix (CP).

Referring to FIG. 1, a radio frame includes 10 subframes, each subframe having 2 slots. Each slot may include a plurality of OFDM symbols in the time domain. The number of OFDM symbols per slot may vary depending on CP types. One slot may include 7 OFDM symbols in a radio frame with a normal CP. If an OFDM symbol is 2048 Ts long in a 10-ms radio frame, the normal CP may be 144 Ts long (Ts=1/(15000×2048)sec).

P-SCHs reside in the last OFDM symbols of slot 0 and slot 10. The same PSS is delivered in the two P-SCHs. The P-SCHs are used to acquire time-domain synchronization such as OFDM symbol synchronization and slot synchronization and/or frequency-domain synchronization. A Zadoff-Chu (ZC) sequence may be used for the PSS. At least one PSS is defined in the wireless communication system.

A ZC sequence is a kind of Constant Amplitude Zero Auto-Correlation (CAZAC) sequence. Let the length of a CAZAC sequence (a positive integer) be denoted by $N_{ZC}$. If a root index, u is relatively prime with $N_{ZC}$, that is, if u is a natural number equal to or smaller than $N_{ZC}$ and relatively prime with $N_{ZC}$, a $k^{th}$ element of a $u^{th}$ CAZAC sequence is given as the following equation (k=0, 1, . . . , $N_{ZC}$−1).

$$d^n(k) = \exp\left\{-j\frac{\pi u k(k+1)}{N_{ZC}}\right\} \quad \text{[Equation 1]}$$

when $N_{ZC}$ is odd number

A CAZAC sequence d(k) has the following three features.

$$|d(k)| = 1 \quad \text{[Equation 2]}$$
for all $k$, $N_{ZC}$, $u$ $$R_{u;N_{ZC}}(m) = \begin{cases} 1, & \text{for } m = 0 \\ 0, & \text{for } m \neq 0 \end{cases} \quad \text{[Equation 3]}$$

$$R_{u_1;u_2;N_{ZC}}(m) = const \quad \text{[Equation 4]}$$
for all $u_1$, $u_2$

[Equation 2] means that the CAZAC sequence is always of length 1 and [Equation 3] means that the auto-correlation of the CAZAC sequence is expressed as a Dirac-delta function. The auto-correlation is based on circular correlation. [Equation 4] means that the cross-correlation of the CAZAC sequence is always a constant.

In the 3GPP LTE system, a sequence d(n) used for a PSS is generated from a ZC sequence of length 63 according to the following equation.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 5]}$$

where the ZC root sequence index u of the ZC sequence is given by [Table 1].

TABLE 1

| $N_{ID}^{(2)}$ | Root index u |
|---|---|
| 0 | 25 |
| 1 | 29 |
| 2 | 34 |

S-SCHs are located at the last second OFDM symbols of slot #0 and slot #10. An S-SCH and a P-SCH may be positioned in contiguous OFDM symbols. Different SSSs may be transmitted on the two S-SCHs. The S-SCHs are used to acquire frame synchronization and/or information about the CP configuration of a cell, that is, information indicating whether a normal CP or an extended CP is used in the cell. One S-SCH uses two SSSs and an m-sequence may be used for each SSS. That is, one S-SCH includes two m-sequences. For example, if one S-SCH includes 63 subcarriers, two m-sequences each having length 31 are mapped to one S-SCH.

An m-sequence is a kind of PN sequence. A PN sequence is reproducible and has similar characteristics to a random sequence. The PN sequence has the following features.

(1) A repetition period is sufficiently long. If a PN sequence has an infinite repetition period, the PN sequence is a random sequence.

(2) During one period, the number of 0s is approximate to the number of 1s.

(3) A part with a run length of 1 is ½, a part with a run length of 2 is ¼, a part with a run length of 3 is ⅛, . . . . A run length refers to the number of consecutive same signs.

(4) The cross-correlation between sequences is very small during one period.

(5) An entire sequence cannot be reproduced using a small sequence segment.

(6) A PN sequence can be reproduced using an appropriate reproduction algorithm.

PN sequences include m-sequences, Gold sequences, Kasami sequences, etc. In addition to the above features, an m-sequence has the feature that the side lobe of a periodic auto-correlation is −1.

The P-SCH and the S-SCH are used to acquire a physical-layer cell ID. There are 168 physical-layer cell ID groups each including three physical-layer IDs. That is, there are 504 unique physical-layer cell IDs. The physical-layer cell IDs are grouped into 168 unique physical-layer cell ID groups in the range of 0 to 167, each group containing three unique physical-layer IDs in the range of 0 to 2. Three ZC sequence root indexes representing physical-layer IDs are available for the P-SCH and 168 m-sequence indexes representing physical-layer cell ID groups are available for the S-SCH.

A Physical Broadcast Channel (P-BCH) is positioned at subframe 0 in a radio frame. The P-BCH occupies 4 OFDM symbols, starting from OFDM symbol 0 of slot 1 (the symbol following a P-SCH) in subframe 0. The P-BCH carries basic system configuration information of a BS. The P-BCH may have a period of 40 ms.

Figure 2:
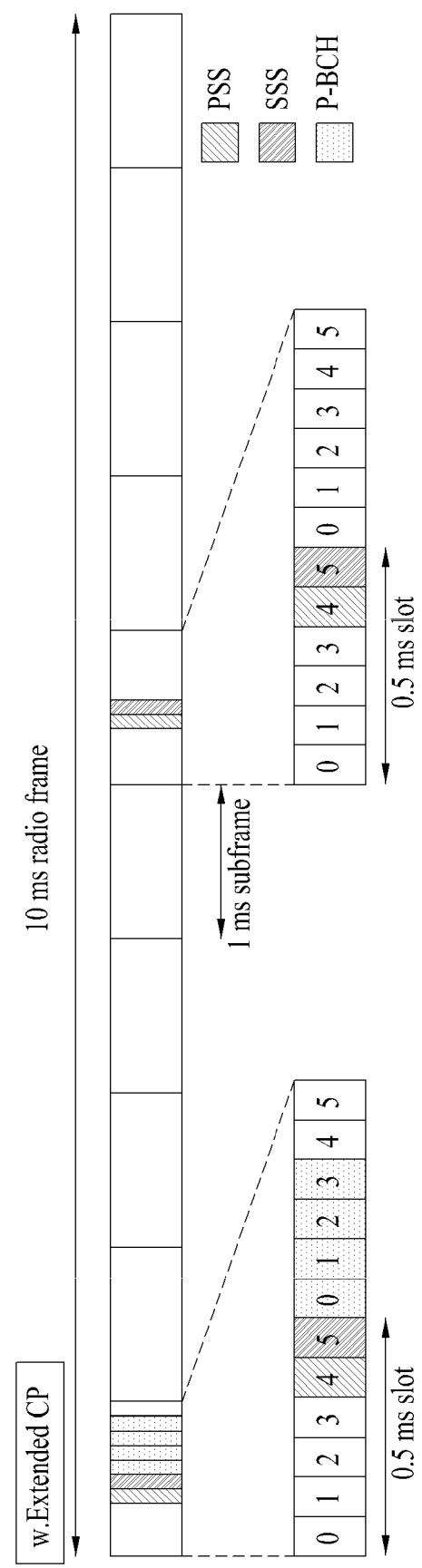
FIG. 2 illustrates an exemplary radio frame structure using an extended CP.

FIG. 2 illustrates an exemplary radio frame structure using an extended CP.

Referring to FIG. 2, compared to the radio frame using a normal CP illustrated in FIG. 1, a radio frame using an extended CP includes 6 OFDM symbols per slot. If an OFDM symbol is 2048 Ts long in a 10-ms radio frame, the extended CP may be 512 Ts long (Ts=1/(15000×2048)sec).

In the radio frame with an extended CP, P-SCHs reside in the last OFDM symbols of slot 0 and slot 10 and S-SCHs reside in the second last symbols of slot 0 and slot 10. A P-BCH is placed in slot 1 of subframe 0, occupying 4 OFDM symbols starting from OFDM symbol 0 of slot 1 (the symbol following a P-SCH).

Figure 3:
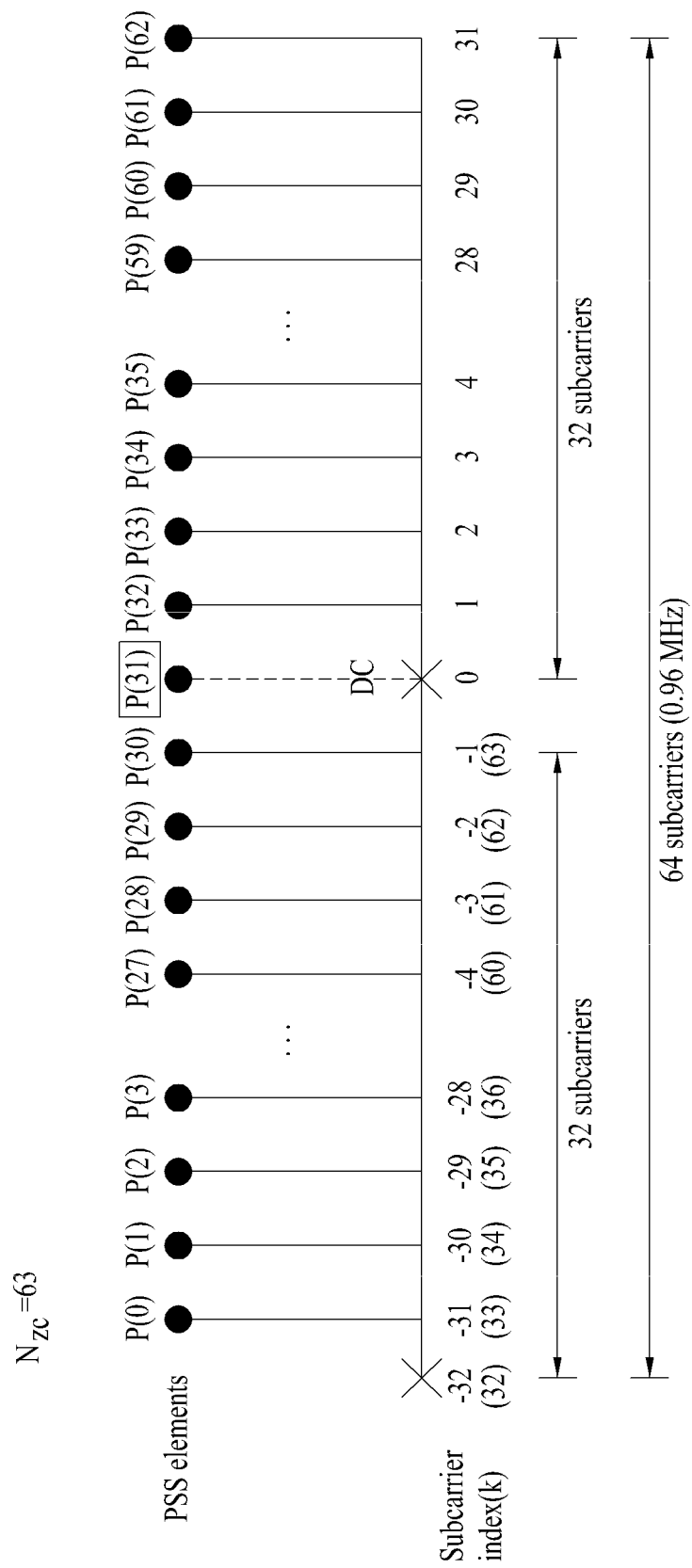
FIG. 3 illustrates exemplary mapping of a sequence to subcarriers on a Primary Synchronization Channel (P-SCH).

FIG. 3 illustrates exemplary mapping of a sequence to subcarriers on a P-SCH. Herein, an FFT window size is 64 (Nf=64).

Referring to FIG. 3, a ZC sequence of length 63 ($N_{ZC}$=63) is mapped to 63 subcarriers including a DC subcarrier. The ZC sequence is sequentially mapped, starting from the leftmost subcarrier such that the center of the ZC sequence, that is, a $31^{th}$ element P(31) is mapped to the DC subcarrier. A null is inserted into a subcarrier to which the sequence is not mapped, herein subcarrier −32. The sequence element P(31) mapped to the DC subcarrier is punctured.

If the left side of the DC subcarrier is referred to as one side of the DC subcarrier, the right side of the DC subcarrier is the other side of the DC subcarrier, which should not be construed as limiting. The FFT window size and ZC sequence length of the P-SCH may be changed freely and accordingly, the ZC sequence may be mapped to subcarriers in various manners. The ZC sequence may be mapped symmetrically with respect to the DC subcarrier in the time domain.

The S-SCH may deliver a cell group ID and radio frame synchronization information. Final information of the S-SCH is transmitted in a combination of two short codes. A combination of two short codes ($m_0$, $m_1$) representing a cell group ID may be defined as $$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)} / 30 \rfloor$$

[Equation 6]

168 cell group IDs are listed using such 2-short code combinations as follows.

TABLE 2

| Error! Objects cannot be created from editing field codes. | Error! Objects cannot be created from editing field codes. | Error! Objects cannot be created from editing field codes. |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |

TABLE 2-continued

| Error! Objects cannot be created from editing field codes. | Error! Objects cannot be created from editing field codes. | Error! Objects cannot be created from editing field codes. |
|---|---|---|
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |

TABLE 2-continued

| | | |
|---|---|---|
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |

The order of ($m_0$, $m_1$) may represent frame timing information. That is, ($m_0$, $m_1$) may represent a Synchronization Signal (SS) of subframe 0 (0 ms) and ($m_1$, $m_0$) may represent an SS of subframe 5 (5 ms).

Figure 4:
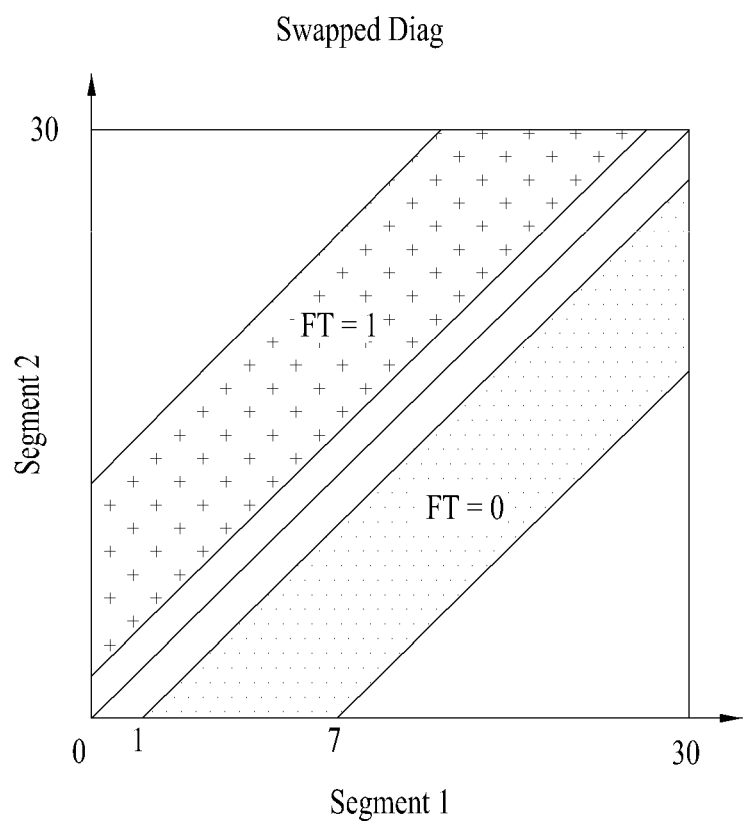
FIG. 4 conceptually illustrates 2-short code combinations used in a $3^{rd}$ Generation Partnership Project (3GPP) Long Term Evolution (LTE) system, from among total 2-short code combinations available for a Secondary Synchronization Channel (S-SCH).

2-short code combinations determined according to [Equation 6] and illustrated in [Table 2] from among all possible combinations ($m_0$, $m_1$) are shown as FIG. 4.

FIG. 4 conceptually illustrates combinations of two short codes used in the 3GPP LTE system from among total 2-short code combinations available for an S-SCH.

Referring to FIG. 4, Segment 1 denotes $m_0$ and Segment 2 denotes $m_1$. FT represents Frame Timing. If FT=0, this indicates an SS for a 0 ms subframe and if FT=1, this indicates an SS for a 5 ms subframe.

On the assumption that two short codes are of length 31 and each code carries 31 pieces of information (31 sequence combinations), 961 (=31×31) cell group IDs may be transmitted in combinations of the two short codes. However, 168 cell group IDs are designed in the example of [Equation 6] and [Table 2] in order to maximize cell ID detection performance, taking into account inter-cell interference. In other words, 168 optimum code combinations are selected from among a total of 961 possible code combinations.

As stated before, these codes may be referred to as Secondary Synchronization Codes (SSCs). A total of 31 sequences may be produced by circularly shifting a length-31 m-sequence generated from a generator polynomial $x^5+x^3+1$.

To reduce ambiguity between neighbor cells regarding the SSC combinations, the SSCs may be scrambled with scrambling sequences mapped to three Primary Synchronization Codes (PSCs) in a one-to-one correspondence. If Cell A has a combination (1, 2) as SSCs and Cell B has a combination (3, 4) as SSCs, a UE is likely to detect a wrong combination of (1, 4) or (3, 2) during SS detection. This phenomenon is referred to as 'ambiguity'.

If Cell A and Cell B have different PSCs and scramble their SSCs with the PSCs, the probability of generating the ambiguity may be reduced by reinforcing the bond between the combinations (1, 2) and (3, 4). For PSC-based scrambling codes used herein, 6 different sequences are generated by circularly shifting a length-31 m-sequence generated using the polynomial $x^5+x^3+1$ and mapped in twos to 3 PSC indexes as illustrated in [Table 1] in a one-to-multi correspondence.

Despite the PSC-based scrambling, the ambiguity may still matter in some cases. For example, if Cell A transmits an SSC combination (1, 2), Cell B transmits an SSC combination (3, 4), and Cell A and Cell B transmit the same PSC, the same PSC leads to the same scrambling code for the SSC combinations. Therefore, the ambiguity problem still remains.

Accordingly, segment 1-based scrambling may be added to the PSC-based scrambling in order to reinforce the bond between the SSC combinations (1, 2) and (3, 4). As stated before, segment 1 represents $m_0$ and segment 2 represents $m_1$ in the SSC combination ($m_0$, $m_1$).

Segment 1-based scrambling is the process of scrambling an SSC of segment 2 with a scrambling code corresponding to the index of segment 1. If Cell A and Cell B use the SSC combinations (1, 2) and (3, 4) respectively, the indexes of segment 1, 1 and 3 represent different codes and thus scrambling codes are also different. Therefore, the bond between the SSC combinations (1, 2) and (3, 4) is reinforced, thus overcoming ambiguity. For segment 1-based scrambling codes, 8 different sequences are generated by circularly shifting a length-31 m-sequence generated from a generator polynomial $x^5+x^4+x^3+x^1+1$ and mapped to indexes of segment 1 in a one-to-multi correspondence. That is, each index of segment 1 is mapped to a segment 1-based scrambling code according to a modulo 8 operation in the 3GPP LTE system.

More specifically, SSCs and scrambling codes may be expressed as follows.

A 62-length sequence d(0), . . . , d(61) used for SSSs is an interleaved concatenation of two length-31 binary sequences. The concatenated sequence may be scrambled with a scrambling sequence based on a PSS.

The combination of two length-31 sequences that defines the SSS differs between subframe 0 and subframe 5 according to $$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 7]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where n denotes an integer ranging from 0 to 30. The indexes, $m_0$ and $m_1$ are derived from the physical-layer cell ID group $N_{ID}^{(1)}$. For the sake of convenience, $m_0$ and $m_1$ are expressed again as $$m_0 = m' \bmod 31$$ [Equation 8]

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

The output of [Equation 8] is listed in [Table 2].

Meanwhile, the two sequences used in [Equation 7], $s_0^{(m_0)}(n)$ and $s_1^{(m_1)}(n)$ are defined as two different cyclic shifts of an m-sequence $\tilde{s}(n)$ according to $$s_0^{(m_0)}(n) = \tilde{s}((n+m_0) \bmod 31)$$

$$s_1^{(m_1)}(n) = \tilde{s}((n+m_1) \bmod 31)$$ [Equation 9]

where $\tilde{s}(i) + 1 - 2x(i)$ ($0 \leq i \leq 30$) is defined by $$x(\bar{i}+5) = (x(\bar{i}+2) + x(\bar{i})) \bmod 2, 0 \leq \bar{i} \leq 25$$ [Equation 10]

with initial conditions $x(0)=0$, $x(1)=0$, $x(2)=0$, $x(3)=0$, $x(4)=1$.

The two scrambling codes $c_0(n)$ and $c_1(n)$ in [Equation 7] depend on the PSS and are defined by two different cyclic shifts of the m-sequence $\tilde{c}(n)$ according to $$c_0(n) = \tilde{c}((n+N_{ID}^{(2)}) \bmod 31)$$

$$c_1(n) = \tilde{c}((n+N_{ID}^{(2)}+3) \bmod 31)$$ [Equation 11]

where $N_{ID}^{(2)}$ indicated by the PSS is $N_{ID}^{(2)} \in \{0,1,2\}$ within the physical-layer cell ID group $N_{ID}^{(1)}$ listed in [Table 1], and $\tilde{c}(i)=1-2x(i)(0\leq i \leq 30)$ is defined by.

$$x(\bar{i}+5) = (x(\bar{i}+3) + x(\bar{i})) \bmod 2, 0 \leq \bar{i} \leq 25$$ [Equation 12]

with initial conditions $x(0)=0$, $x(1)=0$, $x(2)=0$, $x(3)=0$, $x(4)=1$

Meanwhile, the scrambling sequences $z_1^{(m_0)}(n)$ and $z_1^{(m_0)}(n)$ in [Equation 7] are defined as cyclic shifts of the m-sequence $\tilde{z}(n)$ according to $$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31)$$ [Equation 13]

where $m_0$ and $m_1$ are obtained from [Table 2] and $\tilde{z}(i)=1-2x(i)$ ($0 \leq i \leq 30$) is defined by $$x(\bar{i}+5) = (x(\bar{i}+4) + x(\bar{i}+2) + x(\bar{i}+1) + x(\bar{i})) \bmod 2, 0 \leq \bar{i} \leq 25$$ [Equation 14]

with initial conditions $x(0)=0$, $x(1)=0$, $x(2)=0$, $x(3)=0$, $x(4)=1$

Figure 5:
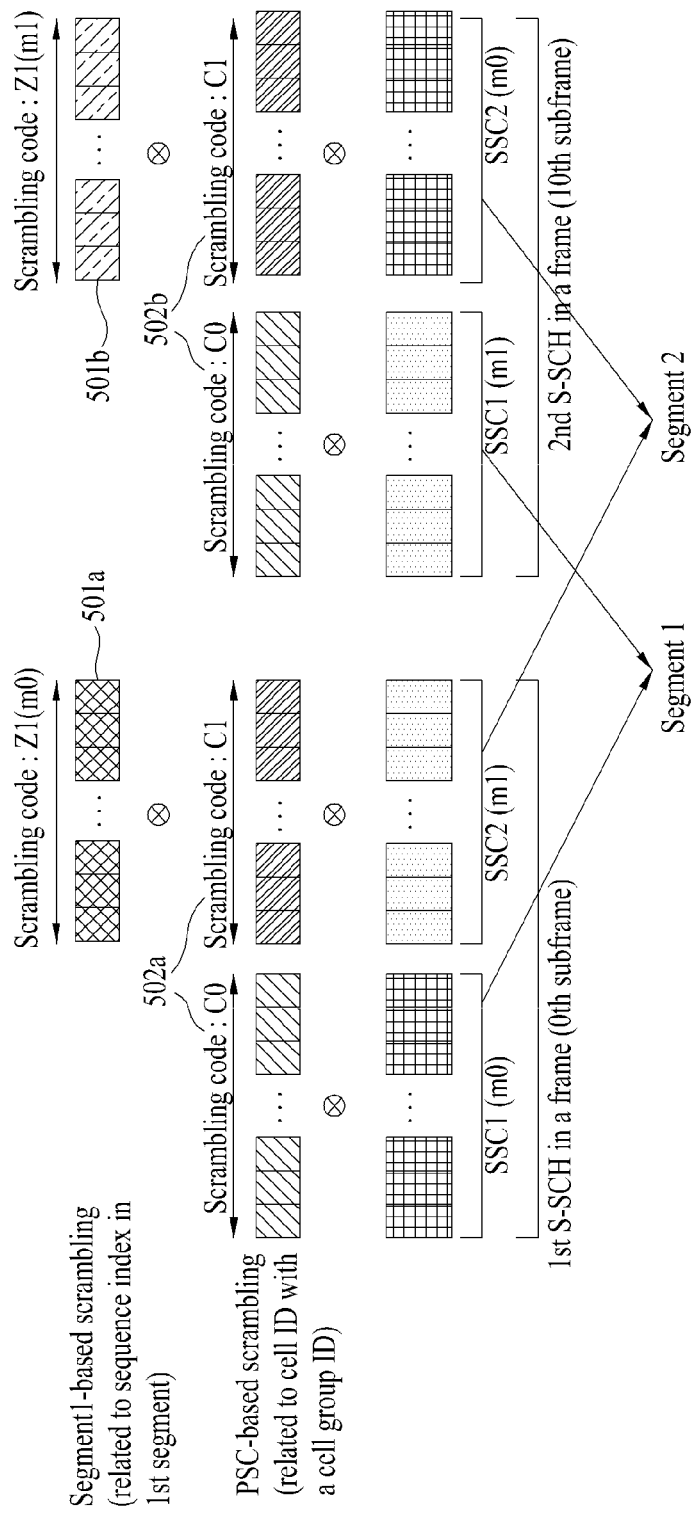
FIG. 5 illustrates the concept of Primary Synchronization Signal (PSS)-based scrambling and segment 1-based scrambling that are performed to overcome ambiguity involved in Secondary Synchronization Signal (SSS) transmission in the 3GPP LTE system.

The above operation may be illustrated as FIG. 5.

FIG. 5 illustrates the concept of PSC-based scrambling and segment 1-based scrambling that are performed to overcome ambiguity involved in SSS transmission in the 3GPP LTE system.

Referring to FIG. 5, reference numerals 501a and 501b denote segment 1-based scrambling codes Z1 expressed in [Equation 13]. Reference numerals 502a and 502b denote PSC-based scrambling codes. The ambiguity involved in SSC transmission may be overcome through these two scrambling schemes.

A final cell ID is defined as $N_{ID}^{cell}=3N_{ID}^{(1)}+N_{ID}^{(2)}$ by combining $N_{ID}^{(2)}$ of a PSS and $N_{ID}^{(1)}$ of an SSS. At present, 504 (=3×168) cell IDs are defined.

In addition to the ambiguity problem, collision may be another problem with cell ID acquisition at a UE. Now a description will be given of the collision problem. When two or more SSSs are accumulated for cell search, collision may occur.

For the sake of convenience, it is assumed that Cell A uses an SSC combination (S11, S12) and Cell B uses an SSC combination (S21, S22). In a combination (a, b), a denotes the SSC index of segment 1 and b denotes the SSC index of segment 2. It is also assumed that Cell A and Cell B use the same PSC index and two S-SCH signals are accumulated in one frame. As noted from [Equation 7], the SSSs transmitted in subframe 0 and subframe 5 are in a swapping relationship. Hence, Cell A=(S11, S12, S12, S11) and Cell B=(S21, S22, S22, S11).

More specifically, for example, if Cell A=(1, 2, 2, 1) and Cell B=(1, 3, 3, 1), interference between the two cells is (a, b, b, a) and thus the Hamming distance is 1 (collision occurs to index 1). Herein, a represents interference between index 1 and index 1 and b represents interference between index 2 and index 3. This collision still remains in the subsequent subframe. In other words, the same interference is repeated during an accumulation period, thereby nullifying interference randomization effects. This phenomenon is defined as 'collision problem'.

As it was assumed before that Cell A and Cell B use the same PSC index, it will not be repeated that the same PSC-based scrambling code is applied to Cell A and Cell B. Under this assumption, segment 1-based scrambling leads to Cell A=(1,c(1)×2,2,c(2)×1) and Cell B=(1,c(1)×3,3,c(3)×3). Hence, interference between the two cells is (a, b, c, d). Apart from collision between the indexes 1, the Hamming distance is 3. That is, every SSC combination experiences different interference, thus achieving interference randomization.

That is, the above collision problem may also be solved through the PSC-based scrambling and the segment 1-based scrambling. A neighbor search scenario is given as follows according to the above description.

Figure 6:
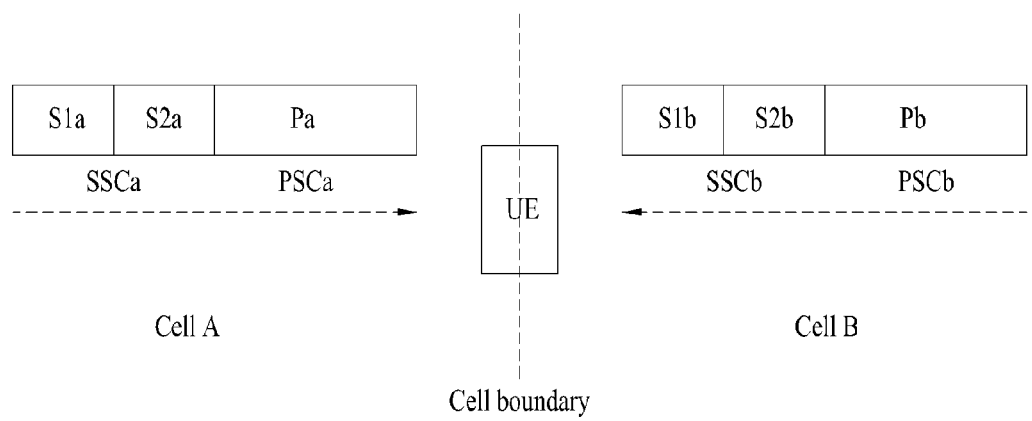
FIG. 6 illustrates a neighbor search scenario.

FIG. 6 illustrates a neighbor search scenario.

Referring to FIG. 6, a UE at a cell boundary simultaneously receives PSCa (Pa) and SSCa (S1a and S1b) from Cell A and PSCb (Pb) and SSCb (S2a and S2b) from Cell B. In this situation, 8 scenarios are possible as listed in [Table 3].

TABLE 3

| No. | Pa & Pb | S1a & S1b | S2a & S2b | Problem |
|---|---|---|---|---|
| 1 | Same | Same | Same | n/a |
| 2 | Same | Same | Different | Collision + Phase mismatch |
| 3 | Same | Different | Same | Collision + Phase mismatch |
| 4 | Same | Different | Different | Ambiguity + Phase mismatch |
| 5 | Different | Same | Same | Phase mismatch |
| 6 | Different | Same | Different | Collision + Phase mismatch |
| 7 | Different | Different | Same | Collision + Phase mismatch |
| 8 | Different | Different | Different | Ambiguity + Phase mismatch |

In [Table 3], 'Phase mismatch' denotes a phase mismatch that occurs when signals from two cells are misaligned in timing. Accordingly, it is preferred to design a cell, taking into account the scenarios of [Table 3].

Cell ID extension/reservation methods according to embodiments of the present invention will be described in the context of a femtocell or a CSG cell under discussion in the 3GPP LTE system. However, the cell ID extension/reservation methods are applicable for extension or reservation of Relay Station (RS) IDs under consideration in the working body LTE-A or IEEE 802.16m based on the same principle. That is, cell ID extension and reservation may be used for identification information of a certain entity and a femtocell ID or a CSG ID may be replaced with an RS ID.

The afore-mentioned RS will be described in brief.

While an IEEE 802.16j RS is described for the sake of convenience, the same applies to an RS of 3GPP IMT-A (LTE-A).

In 2006, IEEE 802.16 publicized a standard IEEE 802.16-2004 aiming at fixed subscriber terminals and a standard IEEE 802.16e-2005 seeking to provide mobility to subscriber terminals. At present, IEEE 802.16 is working on a new standardization project concerning a multi-hop relay. Task Group j in the IEEE 802.16 organization, which takes charge of this project, has started to actively discuss Usage Model, Terminology, and Technical Requirements in the second meeting in July, 2006 after the first official meeting on May, 2006 (802.16TGj is called 802.16j in brief).

The Project Authorization Request (PAR) of 802.16j clarifies two purposes of the standardization, coverage extension and throughput enhancement.

Figure 7:
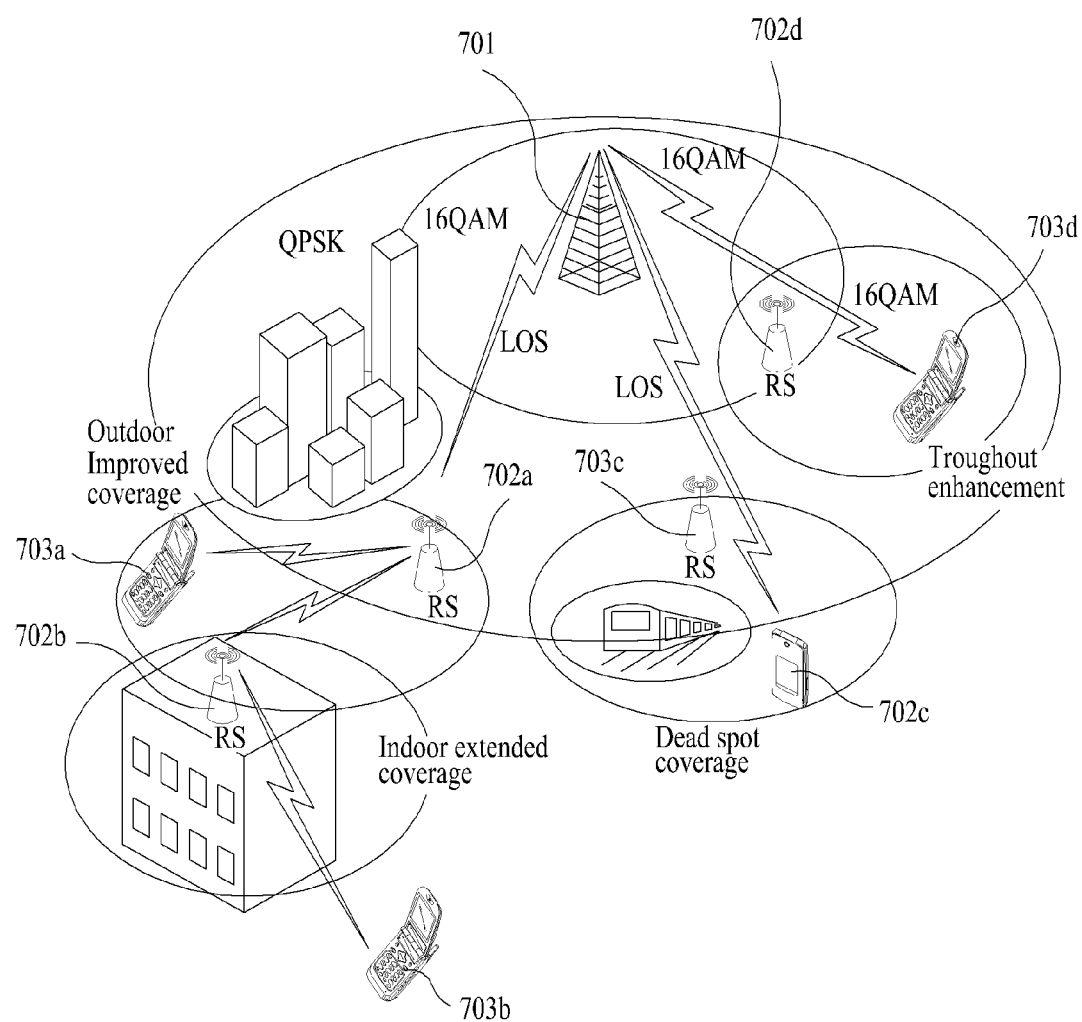
FIG. 7 illustrates the configuration of a multi-hop relay system to which cell ID extension/reservation according embodiments of the present invention is applicable.

FIG. 7 illustrates the configuration of a multi-hop relay system to which cell ID extension/reservation according to embodiments of the present invention is applicable.

Referring to FIG. 7, reference numeral 701 denotes a BS, reference numerals 702a to 702d denote RSs, and reference numerals 703a to 703d denote UEs. The BS 701 may transmit a signal outside its coverage area via the RSs 702a and 702b. For the UE 703d within the coverage of the BS 701, a high-quality link using a high-level Adaptive Modulation and Coding (AMC) may be established via the RS 702d. Hence, system capacity can be increased using the same radio resources.

The standard that will be established by this project is expected to limit its range to addition of RSs and a function for controlling RSs in a legacy BS based on the principle that a UE, conforming to the 802.16-2004 and 802.16e-2005 standards should be able to communicate with an RS without any additional function. Thus, standardization of RSs will be the core of the upcoming standardization.

An RS may be regarded as a subscriber terminal that performs physical-layer operations and a Medium Access Control (MAC)-layer operations. While the RS is controlled mainly by a BS, it may have some control function, when needed. A usage model under discussion covers a mobile RS for providing temporary service to a specific area and an RS installable in a vehicle or the subway, as well as a fixed RS.

Major technical issues requiring future discussion may be summarized as follows.

A procedure for identifying RSs within its coverage area and acquiring and maintaining information about their topology in a BS.

Definition of a physical transmission frame between a UE and an RS with backward compatibility with the legacy IEEE 802.16/16e system.

A signal procedure for providing mobility between RSs or between an RS and a BS.

Network entry of an RS into a BS and network entry of a UE into a BS via an RS.

There may be many other technical issues. Backward compatibility with legacy systems is expected to be a big obstacle to handling the technical issues. As described before, the principle that all UEs conforming to the 802.16-2004 and 802.16e-2005 standards should be able to communicate with BSs via RSs without any additional function not only imposes the constraint that almost all functions defined in the two standards should be performed in the RSs but also increases the complexity of the RSs. Therefore, how this problem is addressed will affect the progress and commercial perspective of the standardization.

Nowadays, Wireless Fidelity (WiFi) is mostly deployed as home/enterprise access points. With WiFI, the fixed to mobile convergence architecture requires a new dual-mode UE (WiFi/GSM or WiFi/UMTS). In a near future, a CSG access point (known also as a home Node B or a femtocell access point) will be widely deployed by simplifying the fixed to mobile architecture since CSG-based deployment will work with existing UEs.

Hence, a UE should be able to efficiently identify CSG cells to which it is authorized to access, while a UE with non-authorized access to CSG cells should avoid any measurements with the CSG cells in order to avoid unnecessary signaling and power waste.

To address the afore-described problems, embodiments of the present invention provide various methods. Hereinbelow, the following two aspects of the present invention will be described based on regulations defined in the current 3GPP LTE standard.

1. Method for increasing 504 physical cell IDs in number.
2. Method for reserving some of the 504 physical cell IDs as CSG cell IDs.

Basically, it is preferable to increase the number of physical cell IDs for newly introduced CSG cells. However, it may not be easy to add physical cell IDs on the timeline of the 3GPP LTE standardization. In this context, a method for reserving some of the 504 physical cell IDs as CSG cell IDs will be described according to one aspect of the present invention. According to another aspect of the present invention, a method for adding physical cell IDs, while minimizing influence on existing cells and existing UEs will be described on the assumption that physical cell IDs can be extended for CSG cells.

As clarified before, the aspects of the present invention are applicable to define RS physical cell IDs, Multimedia Broadcast Multicast Service (MBMS) indicators, and hot spot indicators in an IEEE system as well as CSG physical cell IDs in the 3GPP LTE system, based on the same principle.

The following description is given with the appreciation that cells are divided into CSG cells and macrocells and macrocells are defined as non-CSG cells.

I. One Aspect-Method for Reserving Current Physical Cell IDs for CSG Cells.

The current 3GPP LTE standard defines 168 cell group IDs according to SSSs and 3 cell IDs in each group according to PSSs. Thus a total of 504 (=168×3) physical cell IDs are defined. Methods for reserving a part of the 504 physical cell IDs for CSG cells will be described below according to embodiments of the present invention.

1) PSS Reservation Method

For example, one of the currently defined three PSCs is reserved as a CSG cell ID. In an embodiment of the present invention, root index 25 in [Table 1] is reserved for CSG cells, except for root indexes 25 and 29 satisfying the conjugate symmetry property of PSCs. That is, root indexes 29 and 34 satisfy symmetry with respect to the length 63 of ZC sequences used for PSCs and thus PSCs generated using root indexes 29 and 34 satisfy conjugate symmetry.

A receiver can detect these two PSCs that are in the conjugate symmetry relationship at one operation by adjusting a plus/minus (+/−) operation of intermediate values generated during calculation of correlations with a PSC, rather than the receiver detects the two PSCs by correlating individual PSCs.

First, the conjugate symmetry property will be described.

Referring to [Table 1], the root indexes u of ZC sequences for the PSCs defined in the current 3GPP LTE system are 25, 29 and, 34. With two root indexes satisfying $u_1+u_2=N_{ZC}$ ($N_{ZC}$ is the length of a ZC sequence), the following two ZC sequences are created.

$$d^{u_2}(k)=d^{N_{ZC}-u_1}(k)=(d^{u_1}(k))^-, \text{ when } N_{ZC} \text{ is odd number}$$

$$d^{u_2}(k)=d^{N_{ZC}-u_1}(k)=(-1)\cdot(d^{u_1}(k))^-, \text{ when } N_{ZC} \text{ is even number} \qquad \text{[Equation 15]}$$

When the above relationship expressed as [Equation 15] is established, the correlation outputs with $u_1$ and $u_2$ are calculated with a computation volume equaling a computation volume taken to calculate the correlation output with $u_1$. It is said that two ZC sequences satisfying $u_1+u_2=N_{ZC}$ meet complex symmetry or joint symmetry. Also, it is said that two ZC sequences whose correlation outputs with $u_1$ and $u_2$ can be calculated by one operation are in a complex symmetry or joint symmetry relationship.

The conjugate symmetry between ZC sequences is maintained in the time domain as well as in the frequency domain. Therefore, a PSS may be mapped to the time domain as well as to the frequency domain, for transmission.

If a ZC sequence with $N_{ZC}$ being an odd number is mapped in the time domain in the manner illustrated in FIG. 3 and the time-domain signal is denoted by $a^u(k)$, an intermediate buffer value for calculating a final correlation is defined by $$R_{II} = \frac{1}{N}\sum_{n=0}^{N-1}(r_I(n+d)a_I^{u_1}(k))$$

$$R_{QQ} = \frac{1}{N}\sum_{n=0}^{N-1}(r_Q(n+d)a_Q^{u_1}(k))$$

$$I_{QI} = \frac{1}{N}\sum_{n=0}^{N-1}(r_Q(n+d)a_I^{u_1}(k))$$

$$I_{IQ} = \frac{1}{N}\sum_{n=0}^{N-1}(r_I(n+d)a_Q^{u_1}(k))$$

[Equation 16]

where r(n) denotes a received signal, d is a delay index, and I and Q denote the I (in-phase) component and Q (quadrature-phase) component of a complex signal, respectively.

Thus, the final correlation outputs of $u_1$ and $u_2$ are given as $$R^{u_1}(d)=(R_{II}+R_{QQ})+j(I_{QI}-I_{IQ})$$

$$R^{u_2}(d)=R^{N_{ZC}-u_1}(d)=(R_{II}-R_{QQ})+j(I_{QI}+I_{IQ}) \qquad \text{[Equation 17]}$$

As described before, the joint symmetry between PSSs can be maintained in the time domain as well as in the frequency domain. Therefore, if there are a PSC combination satisfying conjugate symmetry and a PSC combination not satisfying conjugate symmetry among pre-defined PSCs, a PSC not satisfying conjugate symmetry is reserved as a CSG cell ID in the embodiment of the present invention.

2) SSS Reservation Method

For CSG cells, the following interference types should be considered.

(1) Interference between macrocells.
(2) Interference between a macrocell and a CSG cell.
(3) Interference between CSG cells.

For RSs, the following interference types should be considered.

(1) Interference between macrocells.
(2) Interference between a macrocell and an RS.
(3) Interference between RSs.

The same considerations should be discussed for the two cases and thus the following description will center on CSG cells.

From the viewpoint of cell ID detection, the influence of interference may be explained with the ambiguity problem. Among the three interference types, it may be assumed that the 168 SSC combinations were designed so as to minimize (1) interference between macrocells in the 3GPP LTE standard. Although interference is not cancelled in all cases, (1) interference between macrocells and (2) interference between a macrocell and a CSG cell may be cancelled through appropriate cell planning by defining 3 sectors (or 6 sectors) within one CSG cell, because the 168 SSC combinations have already been defined.

However, (3) interference between CSG cells may be problematic. If 50 cell IDs are reserved for CSG cells, it is difficult to cancel interference between CSG cells because a CSG cell typically covers tens of meters, no sector concept is introduced for CSG cells, and multi-CSG cell BSs can be installed within one area. In other words, cell planning is difficult due to too small a number of CSG cell IDs.

While the number of cell IDs reserved as CSG cell IDs has been described as 50, the present invention is not limited to the specific number. One thing to note herein is that interference between CSG cells may be more significant than interference between macrocells.

Accordingly, when SSS indexes are reserved for CSG cells, both ambiguity and collision between CSG cells should be considered. In accordance with an embodiment of the present invention, a CSG cell ID reservation method for overcoming the inter-CSG cell ambiguity and collision is provided.

If there are 50 CSG cells, a UE may receive a plurality of signals having the same PSC because no sector concept is introduced to CSG cells. Among the three solutions to the ambiguity problem mentioned in relation to macrocells, that is, SSC diagonal pairing (see FIG. 4), PSC-based scrambling, and segment 1-based scrambling, the PSC-based scrambling does not help with solving the ambiguity problem.

To solve the ambiguity problem using only cell group IDs indicated by SSSs irrespective of PSCs, the following reservation priority is proposed in an embodiment of the present invention. The following description is given on the assumption that in an SSC pair (SSC1, SSC2), SSC1 represents segment 1 and SSC 2 represents segment 2.

It is assumed that segment 1-based scrambling should be effectively applied to solve the ambiguity and collision problems in the embodiment of the present invention. Herein the swapping relationship should be considered in effectively applying segment 1-based scrambling.

Secondly, if it is difficult to apply segment 1-based scrambling, diagonal pairing is used to solve the ambiguity problem.

If 20 cell IDs, (0, 1), (0, 2), (0, 3), . . . , (0, 20) are reserved as CSG cell IDs, the ambiguity problem does not occur for any of these combinations.

However, each of the SSC pairs contains the same SSC index in segment 1 and thus the total number of correlations is reduced to ½. For instance, when two cells use SSC combinations (0, 1) and (0, 2), respectively, the total number of correlations is reduced to ½ because the same SSC index 0 is used for segment 1 in the SSC combinations. If two SSCs are accumulated, the two cells have (0, c(0)×1, 1, c(1)×0) and (0, c(0)×2, 2, c(2)×0), respectively, thereby decreasing the total number of correlations to ¼ (that is, collision occurs only between SSCs having the same index 0). Herein, for the sake of convenience, correlations are calculated in an intuitive manner by increasing a correlation by 1 when the same index is used.

The interference pattern for the two cells is (a, b, c, d) and thus the Hamming distance is 4. As a result, no collision occurs. However, since correlations increase, segment 1-based scrambling takes priority over diagonal pairing in this embodiment in the SSS reservation method.

In the case of SSC combinations (0, 1) and (7, 8), the collision problem occurs in addition to the above-described ½ correlation problem. For example, a receiver should perform a hypothesis test on swapping (i.e. whether a subframe is subframe 0 or subframe 5) regarding (0, c(0)×1, 1, c(1)×0) and (7, c(7)×8, 8, c(0)×7). Specifically, when the receiver performs a hypothesis test on (7,c(7)×8,8,c(0)×7) on the assumption that a received signal is (0,c(0)×1,1,c(1)×0), neither ambiguity nor collision occurs. On the other hand, when the receiver performs a hypothesis test on (8,c(0)×7,7,c(7)*8) on the assumption that a received signal is (0,c(0)×1,1,c(1)*0), the bold parts are ambiguous (that is, a false alarm of the SSC combination (0, 7) or (8, 1)). This is because the number of segment 1-based scrambling codes is determined to be 8 through a modulo 8 operation of SSC indexes.

In another example of SSC combinations (0, 1) and (8, 9), the bold parts of (0,c(0)×1,1,c(1)×0) and (8,c(0)×9,9,c(1)*8) are ambiguous. In addition, regarding a swapping hypothesis, the bold parts of (0,c(0)×1,1,c(1)×0) and (8,c(0)×7,7,c(7)×8) are ambiguous.

In this context, the following method is proposed in the embodiment of the present invention.

(1) For reserved combinations to which segment 1-based scrambling can be applied differently, all indexes of the reserved combinations are preferably different.

(2) If more cell IDs are needed in addition to the reserved combinations, the cell IDs are preferably selected so as to remove ambiguity.

That is, a method for reserving Nf CSG cell IDs is summarized as follows.

(1) To effectively apply segment 1-based scrambling, taking into account swapping, SSC combinations having all different indexes are selected from among all SSC combinations $(m_0, m_1)$ including cross combinations, from the viewpoint of mod(M). M is the number of defined scrambling codes. That is, if Cell A=$(m_0, m_1)$ and Cell B=$(m_2, m_3)$, SSC combinations are selected in a manner that satisfies mod(m0, M)≠mod(m2,M), mod(m0,M)≠mod(m3,M), mod (m1,M) mod(m2,M), mod(m1,M)mod(m3 M).

In a specific example according to this embodiment, the SSC combination selection starts with SSC combinations having a distance of 1 between $m_0$ and $m_1$. That is, 4 cell group IDs, $(m_0, m_1)$=(0,1), (2,3), (4,5), (6,7) in Table 2 are reserved. This means that indexes of $N_{ID}^{(1)}$ 0, 2, 4 and 6 are selected from Table 2. As a consequence, a total of 12 (=3×4) physical cell IDs may be reserved.

(2) If more cell IDs are required, SSC combinations that are overlapped only once with the SSC combinations selected in (1) from a modular viewpoint are selected from among all cross combinations produced based on SSS swapping between subframes. Specifically, it is assumed that SSC combinations having a distance of 1 between $m_0$ and $m_1$ are selected. That is, indexes of $N_{ID}^{(1)}$ 1, 3, 5 and 7 are selected in addition to the indexes of $N_{ID}^{(1)}$ 0, 2, 4 and 6. Thus 4 cell group IDs, $(m_0, m_1)$=(1,2), (3,4), (5,6), (7,8) are selected in addition to the 4 cell group IDs $(m_0, m_1)$=(0,1), (2,3), (4,5), (6,7). Thus a total of 8 cell group IDs are selected and as a result, 24 (=3×8) cell IDs are reserved for CSG cells.

(3) If more cell IDs are required again, SSC combinations that are overlapped only once with the SSC combinations selected in (2) from a modular viewpoint are selected from among all of the afore-described cross combinations. In an embodiment of the present invention, SSC combinations having a distance of 2 between $m_0$ and $m_1$ are selected. That is, indexes of $N_{ID}^{(1)}$ 30 to 36 are selected in addition to the indexes of $N_{ID}^{(1)}$ 0 to 6. Thus 7 cell group IDs $(m_0, m_1)$=(0,2), (1,3), (2,4), (3,5), (4,6), (5,7), (6,8) are added to the 8 cell group IDs $(m_0, m_1)$=(0,1), (2,3), (4,5), (6,7), (1,2), (3,4), (5,6), (7,8). Thus a total of 15 (=8+7) cell group IDs are selected and as a result, 45 (=3×15) cell IDs are reserved for CSG cells.

(4) If more cell IDs are required again, SSC combinations that are overlapped only once with the SSC combinations selected in (1), (2) and (3) from a modular viewpoint are selected. In an embodiment of the present invention, SSC combinations having a distance of 3 between $m_0$ and $m_1$ are selected. That is, the indexes of $N_{ID}^{(1)}$ 59 to 64 are selected additionally. Thus 6 cell group IDs $(m_0, m_1)$=(0,3), (1,4), (2,5), (3,6), (4,7), (5,8) are added to the 15 cell group IDs $(m_0, m_1)$=(0,1), (2,3), (4,5), (6,7), (1,2), (3,4), (5,6), (7,8), (0,2), (1,3), (2,4), (3,5), (4,6), (5,7), (6,8). Thus a total of 21 (=15+6) cell group IDs are selected and as a result, 63 (=3×21) cell IDs are reserved for CSG cells.

(5) If more cell IDs are required again, SSC combinations having segments that are overlapped only once with the segments of the SSC combinations selected in (1) to (4) from a modular viewpoint are selected from among all cross combinations. In an embodiment of the present invention, SSC combinations having a distance of 4 between $m_0$ and $m_1$ are selected. That is, indexes of $N_{ID}^{(1)}$ 87 to 91 are selected additionally. Thus 5 cell group IDs such as $(m_0, m_1)$=(0,4), (1,5), (2,6), (3,7), (4,8) are added. Thus a total of 26 (=21+5) cell group IDs are selected and as a result, 78 (=3×26) cell IDs are reserved for CSG cells.

(6) If combinations more cell IDs are required again, SSC combinations that are overlapped only once with the SSC combinations selected in (1) to (5) from a modular viewpoint are selected. In an embodiment of then present invention, SSC combinations having a distance of 5 between $m_0$ and $m_1$ are selected. That is, indexes of $N_{ID}^{(1)}$ 114 to 117 are selected additionally. Thus cell group IDs $(m_0, m_1)$=(0,5), (1,6), (2,7), (3,8) are added. Thus a total of 30 (=26+4) cell group IDs are selected and as a result, 90 (=3×30) cell IDs are reserved for CSG cells.

(7) If more cell IDs are required again combinations, SSC combinations that are overlapped only once with the SSC combinations selected in (1) to (6) from a modular viewpoint are selected. In an embodiment of the present invention, SSC combinations having a distance of 6 between $m_0$ and $m_1$ are selected. That is, the indexes of $N_{ID}^{(1)}$ 140, 141 and 142 are selected additionally. Thus cell group IDs $(m_0, m_1)$=(0,6), (1,7), (2,8) are added. Thus a total of 33 (=30+3) cell group IDs are selected and as a result, 99 (=3×33) cell IDs are reserved for CSG cells.

(8) If more cell IDs are required again, SSC combinations that are overlapped only once with the SSC combinations selected in (1) to (7) from a modular viewpoint are selected. In an embodiment of the present invention, SSC combinations having a distance of 7 between $m_0$ and $m_1$ are selected. That is, indexes of $N_{ID}^{(1)}$ 165 and 166 are selected additionally. Thus cell group IDs $(m_0, m_1)=(0,7), (1,8)$ are added. Thus a total of 35 (=33+2) cell group IDs are selected and as a result, 105 (=3×35) cell IDs are reserved for CSG cells.

As described above, cell group IDs are selected in an ascending order of the distance between the segments of each SSC combination in such a manner that the overlap between the segments of each combination and the segments of other combinations is minimized, taking into account a modulo operation.

The above-described concept of the embodiment of the present invention is expressed as the following Matlab algorithm.

<Matlab algorithm 1>

```
N_d: distance between m_0 and m_1
M: number of seg1-based scrambling codes
%% program start
M=8; % for this example
m_start=0; % this value can be changed such as m_start=1 or m_start=10, etc
MatSetCSG=[ ];
N_d=1;
while M-N_d>0,
    for ii=0:M-(N_d-1)-1,
        MatSetCSG=[ MatSetCSG; m_start+ii m_start+ii+N_d ];
    end % end of for, ii
    N_d = N_d+1;
end % end of while
%% program end
```

MatSetCSG generated (i.e. $(m_0, m_1)$ combinations selected) by Matlab algorithm 1 are given as follows.

MatSetCSG=[
0 1
1 2
2 3
3 4
4 5
5 6
6 7
7 8
0 2
1 3
2 4
3 5
4 6
5 7
6 8
0 3
1 4
2 5
3 6
4 7
5 8
0 4
1 5
2 6
3 7
4 8
0 5
1 6
2 7
3 8
0 6
1 7
2 8
0 7
1 8
];

Herein, 35 cell group IDs may be reserved and thus a total of 105 cell IDs may be reserved for CSG cells.

If Nx cell IDs (Nx is smaller than 105) are to be reserved, Nx cell IDs may be selected from the above combinations. For instance, if 51 cell IDs are to be reserved, 17 cell group IDs are selected for CSG cells and thus a total of 51 cell IDs can be reserved. To reserve 48 cell IDs, 16 cell group IDs may be selected.

A desired number of cell IDs are selected preferably in the order of generation, to which the present invention is not limited. While an initial value m_start=0 in Matlab algorithm 1, this value may be changed. For instance, if m_start=1, the result is given as follows.

MatSetCSG=[
1 2
2 3
3 4
4 5
5 6
6 7
7 8
8 9
1 3

```
2 4
3 5
4 6
5 7
6 8
7 9
1 4
2 5
3 6
4 7
6 9
1 5
2 6
3 7
4 8
5 9
1 6
2 7
3 8
4 9
1 7
2 8
3 9
1 8
2 9
];
```

Considering swapping between two SSCs, Matlab algorithm 1 may be modified to Matlab algorithm 2 in another embodiment of the present invention.

<Matlab algorithm 2>

```
N_d: distance between m_0 and m_1
M: number of seg1-based scrambling codes
%% program start
M=8; % for this example
m_start=0; % this value can be changed such as m_start=1 or m_start=10, etc
    MatSetCSG=[ ];
    N_d=1;
    while M-N_d>0,
        for ii=0:M-(N_d-1)-2, % this part has been changed.
            MatSetCSG=[ MatSetCSG; m_start+ii m_start+ii+N_d ];
        end % end of for, ii
        N_d = N_d+1;
    end % end of while
%% program end
```

The followings are combinations selected by Matlab algorithm 2.

```
MatSetCSG=[
0 1
1 2
2 3
3 4
4 5
5 6
6 7
0 2
1 3
2 4
3 5
4 6
5 7
0 3
1 4
2 5
3 6
4 7
0 4
1 5
2 6
3 7
0 5
1 6
2 7
0 6
1 7
]
```

That is, as 28 cell group IDs are selected, a total of 84 cell IDs are used for CSG cells.

In another embodiment of the present invention, different indexes are reserved for all combinations (including cross combinations), while eliminating ambiguity from total candidates. For this purpose, the following two criteria may be set.

Different indexes are selected to solve the ambiguity problem through segment 1-based scrambling. All selected combinations should contain different indexes in order to solve the ambiguity problem that may be encountered with swapping between $m_0$ and $m_1$.

If the number of segment 1-based scrambling codes is limited, combinations with ambiguity are eliminated from total candidates.

For example, indexes of $N_{ID}^{(1)}$ 0, 2, 4, ..., 28 are selected from an SSC table such as Table 2. Thus, the following 15 ($m_0$, $m_1$) combinations are selected: (0,1) (2,3) (4,5) (6,7) (8,9) (10,11) (12,13) (14,15) (16,17) (18,19) (20, 21) (22, 23) (24, 25) (26, 27) (28,29).

Given 8 segment 1-based scrambling codes, the SSC combinations may be classified into 4 groups.

| | |
|---|---|
| Group 1: | (0, 1) (2, 3) (4, 5) (6, 7) |
| Group 2: | (8, 9) (10, 11) (12, 13) (14, 15) |
| Group 3: | (16, 17) (18, 19) (20, 21) (22, 23) |
| Group 4: | (24, 25) (26, 27) (28, 29) |

With segment 1-based scrambling, ambiguity is removed within each group. However, the ambiguity problem may occur between groups. For example, (0, 1) of Group 1 and (8, 9) of Group 2 use the same segment 1-based scrambling code, and thus the ambiguity problem may occur to (0, 9) or (8, 1). However, since (0, 9) or (8, 1) (a swapped version of (1, 8)) is not included in the SSC table such as Table 2, the ambiguity problem does not occur. Accordingly, 15 final selected combinations are (0,1) (2,3) (4,5) (6,7) (8,9) (10,11) (12,13) (14, 15) (16,17) (18,19) (20,21) (22,23) (24,25) (26,27) (28,29).

Hence, a total of 45 (=3×15) cell IDs can be reserved for CSG cells.

Cell IDs may be reserved for CSG cells by using the above embodiments of the present invention in combination.

Now a description will be given of a method for adding CSG cell IDs to existing physical cell IDs.

II. Another Aspect-Method for Increasing Physical Cell IDs in Number

1) Method for Increasing Number of SSS Indexes

To minimize the ambiguity problem of 2-short code combinations for SSSs in the 3GPP LTE standard, the following three concepts have been introduced.

Diagonal SSC pairing (see FIG. 4)
PSC-based scrambling
Segment 1-based scrambling When diagonal SSC pairing is not considered, combinations of two length-31 short codes used as SSSs can carry a total of 961 (=31×31) pieces of information. Considering swapping between SSC pairs transmitted at 0 ms and 5 ms as expressed in [Equation 7], a total of 465 ($=_{31}C_2$) sequence combinations are possible.

The current 3GPP LTE standard defines 168 SSC combinations each having two short codes. Considering only swapping between SSC pairs at 0 ms and 5 ms, 297 (=465-168) more SSC pairs can be added. Then the total number of cell IDs can be increased to 1395 (=465×3).

If the number of SSC pairs is to be increased to be smaller than 465, no up to 465, the following HeBN cell (CSG cell) characteristics should be considered. In the case where cell IDs are allocated to macrocells, interference from a cell using the same PSC is negligibly small. If a total of 57 cells exist in two tiers and cell planning is well done, only 9 cells will be vulnerable to weak interference.

However, CSG cells cover small areas (usually, tens of meters) and the concept of sector cannot be introduced to CSG cells. Thus ambiguity or collision is an important issue for all possible sequence combinations.

An SSC adding method according to an embodiment of the present invention is based on the same principle as the method for reserving a part of currently defined SSSs for CSG cells according to one aspect of the present invention, except that CSG cell IDs are newly defined in a manner that removes ambiguity or collision, while keeping the cell IDs defined as illustrated in Table 2 as they are.

In view of the same basic principle, this embodiment will be described, centering on Matlab algorithms.

<Matlab algorithm 3>

N_d: distance between m_0 and m_1
M: number of seg1-based scrambling codes
    %% program start
    M=8; % for this example
    m_start=0; % this value can be changed such as m_start=1 or m_start=10, etc
    MaxIdx=30; % 0~30 because of length-31 m-sequence
    MatSetCSG=[ ];
    N_d=1+M;
    while ( (m_start+ M-( mod(N_d, M)-1)-1+N_d<MaxIdx)|( m_start+ M-( mod(N_d, M)-1)-1+N_d==MaxIdx) ),
        for ii=0:M-( mod(N_d, M)-1)-1,
            MatSetCSG=[ MatSetCSG; m_start+ii m_start+ii+N_d ];
        end % end of for, ii
        N_d = N_d+1;
    end % end of while
    %% program end N_d is set to 9 (N_d=9) in order to allocate (m_0, m_1) combinations other than already defined cell group IDs from a modular viewpoint.

For example, ($m_0$, $m_1$) combinations representing cell group IDs, generated by Matlab algorithm 3 are given as follows.

MatSetCSG=[

0 9

1 10

2 11

3 12

4 13

5 14

6 15

7 16

0 10

1 11

2 12

3 13

4 14

5 15

6 16

0 11

1 12

2 13

3 14

4 15
5 16
0 12
1 13
2 14
3 15
4 16
0 13
1 14
2 15
3 16
0 14
1 15
2 16
0 15
1 16
0 16
1 17
2 18
3 19
4 20
5 21
6 22
7 23
8 24
0 17
1 18
2 19
3 20
4 21
5 22
6 23
7 24
0 18
1 19
2 20
3 21

4 22
5 23
6 24
0 19
1 20
2 21
3 22
4 23
5 24
0 20
1 21
2 22
3 23
4 24
0 21
1 22
2 23
3 24
0 22
1 23
2 24
0 23
1 24
]

That is, a total of 79 cell group IDs may be added and thus a total of 237 cell IDs may be additionally defined since each cell group includes three cell IDs represented by three PSCs. A desired number of cell group IDs may be selected from the 79 cell group IDs, for CSG cells. Preferably, a desired number of cell group IDs are selected in the order of generation, which should not be construed as limiting the present invention.

While it is assumed that m_start=0 in this embodiment, this is purely exemplary. In another embodiment of the present invention m_start=1 and the resulting combinations are added as follows.

MatSetCSG=[

1 10
2 11
3 12
4 13
5 14
6 15

7 16
8 17
1 11
2 12
3 13
4 14
5 15
6 16
7 17
1 12
2 13
3 14
4 15
5 16
6 17
1 13
2 14
3 15
4 16
5 17
1 14
2 15
3 16
4 17
1 15
2 16
3 17
1 16
2 17
1 17
2 18
3 19
4 20
5 21
6 22
7 23
8 24

9 25
1 18
2 19
3 20
4 21
5 22
6 23
7 24
8 25
1 19
2 20
3 21
4 22
5 23
6 24
7 25
1 20
2 21
3 22
4 23
5 24
6 25
1 21
2 22
3 23
4 24
5 25
1 22
2 23
3 24
4 25
1 23
2 24
3 25
1 24
2 25
];

Considering swapping between SSC1 and SSC2 in the above case, Matlab algorithm 3 may be modified to Matlab algorithm 4.

```
<Matlab algorithm 4>

N_d: distance between m_0 and m_1
M: number of seg1-based scrambling codes.
    %% program start
    M=8; % for this example
    m_start=0; % this value can be changed such as m_start=1 or m_start=10, etc
    MaxIdx=30; % 0~30 because of length-31 m-sequence
    MatSetCSG=[ ];
    N_d=1+M;
    while ( (m_start+ M-( mod(N_d, M)-1)-1+N_d<MaxIdx)|( m_start+ M-( mod(N_d, M)-1)-1+N_d==MaxIdx) ),
        for ii=0:M-( mod(N_d, M)-1)-2, % this part has been changed
            MatSetCSG=[ MatSetCSG; m_start+ii m_start+ii+N_d ];
        end % end of for, ii
        N_d = N_d+1;
    end % end of while
    %% program end
```

Therefore, 64 cell group IDs, that is, 192 cell IDs may be reserved for CSG cells.

MatSetCSG=[

0 9
1 10
2 11
3 12
4 13
5 14
6 15
0 10
1 11
2 12
3 13
4 14
5 15
0 11
1 12
2 13
3 14
4 15
0 12
1 13
2 14
3 15
0 13
1 14
2 15
0 14
1 15
0 15
0 16
1 17
2 18
3 19
4 20
5 21
6 22
7 23
0 17
1 18
2 19
3 20
4 21
5 22
6 23
0 18
1 19
2 20
3 21
4 22
5 23
0 19
1 20
2 21
3 22
4 23
0 20
1 21
2 22
3 23
0 21

1 22

2 23

0 22

1 23

0 23

]

2) Method for Increasing Number of PSS Indexes

A method for defining CSG cell IDs by adding PSCs, not SSCs according to another embodiment of the present invention will be described below.

As stated before, the current 3GPP LTE standard defines ZC root indexes 25, 29 and 34 as PSC root indexes. Among them, the PSC root indexes 29 and 34 (=63-29) satisfies conjugate symmetry and thus a receiver can detect the signals through one correlation calculation.

Accordingly, one root index for CSG cells is additionally defined as a PSC index for use as a CSG cell indicator in this embodiment. Particularly, the additional root index is 38 (=63−25) in a conjugate symmetry relationship with the other root index 25. In other words, a root index is selected, which satisfies a root symmetry property with the remaining index except for an index combination satisfying the root symmetry property, so as to be used for CSG cells or HeNBs.

For example, if PSC indexes are {26, 29, 34}, index (=63-26) satisfying the conjugate symmetry with index 26 may be used as an HeNB index. If the current defined PSCs use ZC root indexes {29, 34, 37}, ZC root index 26 (=63-37) may be used as an HeNB index.

This embodiment in which an additional PSC satisfying the conjugate symmetry property is defined may be used together with the embodiment in which SSCs are added. That is, because the same PSC is used in HeNBs, the PSC-based scrambling effect may not be achieved in this embodiment. That is, the above concept may be applied together with the definition of an additional PSC index in order to remove ambiguity between neighbor cells.

Herein, PSC-based scrambling may be applied, taking into account interference between a macrocell and a CSG cell. For example, if a PSC indicates a CSG cell (femtocell) is, applied PSC-based scrambling codes may be defined by equation 18 and equation 19.

$$c_0(n) = \tilde{c}((n+N_{ID}^{(2)}) \bmod 31)$$

$$c_1(n) = \tilde{c}((n+N_{ID}^{(2)}+4) \bmod 31) \quad \text{[Equation 18]}$$

$$c_0(n) = \tilde{c}((n+6) \bmod 31)$$

$$c_1(n) = \tilde{c}((n+7) \bmod 31) \quad \text{[Equation 19]}$$

In an embodiment of the present invention, a macro cell is distinguished from a femtocell (an HeNB cell or a CSG cell) by the time relationship between an SSS and a PSS. While this method is described in the context of acquiring a CSG cell indicator, it may be interpreted as a method for increasing the number of cell IDs.

The time relationship between an SSS and a PSS in FDD (frame structure 1 in 3GPP LTE) has been described with reference to FIGS. 1 and 2. The time relationship between an SSS and a PSS will be described in greater detail.

Figure 8:
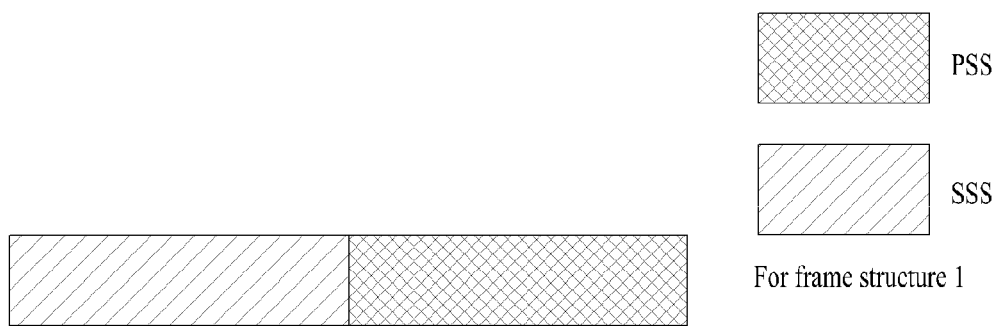
FIG. 8 illustrates a time relationship between a PSS and an SSS.
Figure 9:
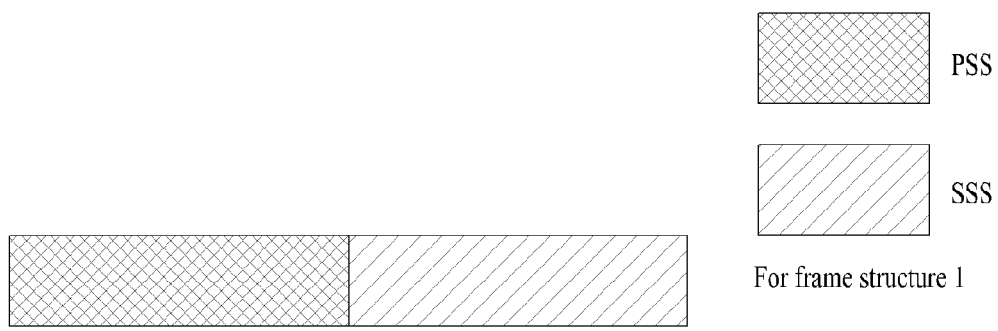
FIG. 9 illustrates a method for transmitting additional information by changing the time positions of an SSS and a PSS according to an embodiment of the present invention.

FIG. 8 illustrates a time relationship between a PSS and an SSS and FIG. 9 illustrates a method for transmitting additional information by changing the time positions of an SSS and a PSS according to an embodiment of the present invention.

Referring to FIG. 8, a PSS is located at the last OFDM symbol of the first slot in subframe 0, specifically in symbol 6 in the case of a normal CP and in symbol 5 in the case of an extended CP and an SSS is positioned in the OFDM symbol previous to the PSS in the current 3GPP LTE system. Therefore, if a PSS is transmitted in the slot following an SSS in the same time relationship illustrated in FIG. 8, this indicates a macrocell in the embodiment of the present invention. On the other hand, if the PSS precedes the SSS as illustrated in FIG. 9, this indicates a CSG cell.

In the embodiment of the present invention, a CSG cell is indicated by the time relationship between a PSS and an SSS. That is, the SSS-PSS ordering indicates a macrocell and the PSS-SSS ordering indicates a CSG cell. In this case, a UE may identify whether each cell is a macrocell or a CSG cell by performing a hypothesis test on the time position of an SSS with respect to a PSS.

In an example of the time relationship illustrated in FIG. 9, transmission of an SSS in symbol 5 and a PSS in symbol 6 in slot 0 of subframe 0 in a normal CP mode may indicate a macrocell ID and transmission of a PSS in symbol 5 and an SSS in symbol 6 in slot 0 of subframe 0 in a normal CP mode may indicate a CSG cell ID. In an extended CP mode, transmission of an SSS in symbol 5 and a PSC in symbol 6 in slot 0 subframe 0 may indicate a macrocell ID and transmission of a PSC in symbol 5 and an SSS in symbol 6 in slot 0 of subframe 0 may indicate a CSG cell ID. In this manner, the conventional 504 cell IDs may be doubled.

While the time relationships illustrated in FIGS. 8 and 9 are described as indicating a non-CSG cell and a CSG cell, respectively, this is purely exemplary and thus the opposite case is also possible. That is, the time relationships illustrated in FIGS. 8 and 9 may indicate a CSG cell and a non-CSG cell, respectively.

There is no need for placing a PSS and an SSS in contiguous OFDM symbols as illustrated in FIGS. 8 and 9.

In summary, an additional cell ID can be defined according to a relative timing or order between a PSS and an SSS. The additional cell ID may be used especially as an HeNB cell ID (CSG cell ID or femtocell ID).

3) Method for Using Scrambling Codes

In accordance with an embodiment of the present invention, a CSG cell is distinguished by performing segment 2-based scrambling on an SS transmitted by the CSG cell, while existing cell IDs are still used.

If there are a UE supporting only a macrocell and a UE supporting both a macrocell and a CSG cell, the latter UE may detect a CSG cell indicator without affecting the former UE. That is, a CSG cell can be indicated through scrambling.

The segment 2-based scrambling may be expressed as the following equation.

$$d(2n) = \begin{cases} s_0^{(m_0)}(n)c_0(n)z_1^{(m_1)}(n) & \text{in subframe 0} \\ s_1^{(m_1)}(n)c_0(n)z_1^{(m_0)}(n) & \text{in subframe 5} \end{cases} \quad \text{[Equation 20]}$$

$$d(2n+1) = \begin{cases} s_1^{(m_1)}(n)c_1(n) & \text{in subframe 0} \\ s_0^{(m_0)}(n)c_1(n) & \text{in subframe 5} \end{cases}$$

In another method, a CSG cell may be indicated by defining PSC-based scrambling codes as follows.

$$d(2n) = \begin{cases} s_0^{(m_0)}(n)c_1(n) & \text{in subframe 0} \\ s_1^{(m_1)}(n)c_1(n) & \text{in subframe 5} \end{cases} \quad \text{[Equation 21]}$$

$$d(2n+1) = \begin{cases} s_1^{(m_1)}(n)c_0(n)z_1^{(m_0)}(n) & \text{in subframe 0} \\ s_0^{(m_0)}(n)c_0(n)z_1^{(m_1)}(n) & \text{in subframe 5} \end{cases}$$

[Equation 20] and [Equation 21] may be combined to indicate a CSG cell. That is, a CSG cell may be indicated by defining the following two SSCs.

$$d(2n) = \begin{cases} s_0^{(m_0)}(n)c_1(n)z_1^{(m_1)}(n) & \text{in subframe 0} \\ s_1^{(m_1)}(n)c_1(n)z_1^{(m_0)}(n) & \text{in subframe 5} \end{cases} \quad \text{[Equation 22]}$$

$$d(2n+1) = \begin{cases} s_1^{(m_1)}(n)c_0(n) & \text{in subframe 0} \\ s_0^{(m_0)}(n)c_0(n) & \text{in subframe 5} \end{cases}$$

[Equation 20], [Equation 21] and [Equation 22] describe utilizing existing scrambling codes. However, additional sequences may be defined at the risk of a memory constraint.

For example, segment 2-based scrambling for CSG may be expressed as $$d(2n) = \begin{cases} s_0^{(m_0)}(n)c_0(n)z_2^{(m_1)}(n) & \text{in subframe 0} \\ s_1^{(m_1)}(n)c_0(n)z_2^{(m_0)}(n) & \text{in subframe 5} \end{cases} \quad \text{[Equation 23]}$$

$$d(2n+1) = \begin{cases} s_1^{(m_1)}(n)c_1(n) & \text{in subframe 0} \\ s_0^{(m_0)}(n)c_1(n) & \text{in subframe 5} \end{cases}$$

The segment 2-based scrambling sequences $z_2^{(m_0)}(n)$ and $z_2^{(m_1)}(n)$ may be given as $$z_2^{(m_0)}(n) = \tilde{z}((n+(m_0 \bmod 8+n_{off})) \bmod 31)$$

$$z_2^{(m_1)}(n) = \tilde{z}((n+(m_1 \bmod 8+n_{off})) \bmod 31) \quad \text{[Equation 24]}$$

where $n_{off}$ is defined distinguishably from existing scrambling codes. For example, $n_{off}=8$.

PSC-based scrambling codes may be additionally generated for CSG according to $$d(2n) = \begin{cases} s_0^{(m_0)}(n)c_2(n) & \text{in subframe 0} \\ s_1^{(m_1)}(n)c_2(n) & \text{in subframe 5} \end{cases} \quad \text{[Equation 25]}$$

$$d(2n+1) = \begin{cases} s_1^{(m_1)}(n)c_3(n)z_1^{(m_0)}(n) & \text{in subframe 0} \\ s_0^{(m_0)}(n)c_3(n)z_1^{(m_1)}(n) & \text{in subframe 5} \end{cases}$$

The newly defined PSC-based scrambling codes are expressed as the following equation.

$$c_2(n) = \tilde{c}((n+N'_{ID}) \bmod 31)$$

$$c_3(n) = \tilde{c}((n+N'_{ID}+1) \bmod 31) \quad \text{[Equation 26]}$$

where $N'_{ID}$ is defined distinguishably from the existing scrambling codes. For example, $N'_{ID}=6$ The method for increasing the number of cell IDs through SS swapping and the method for increasing the number of cell IDs using PSS-based scrambling codes may be used in combination. For the sake of convenience, a method for adding CSG cell IDs, that is, additionally indicating CSG cells, while maintaining cell IDs for non-CSG cells will be described, by way of example.

For instance, it is assumed that transmission of a PSS after an SSS (hereinafter, referred to as "SSS+PSS transmission") indicates a non-CSG cell and transmission of an SSS after a PSS (hereinafter, referred to as "PSS+SSS transmission") indicates a CSG cell. Under this assumption, 6 PSC-based scrambling codes with indexes 0 to 5 may be defined for non-CSG cells and transmitted in the SSS+PSS scheme. In addition, 6 circular shifted indexes 6 to 11 may be defined for CSG cells and codes corresponding to the indexes may be transmitted in the PSS+SSS scheme. The circular shifted indexes are purely exemplary.

The combined method of SS swapping and PSS-based scrambling offers the following benefits.

A 2-cell scenario is assumed. As described above, the same assumption that the SSS+PSS transmission indicates a non-CSG cell and the PSS+SSS transmission indicates a CSG cell is maintained.

FIG. 10 illustrates a problem that may be caused by using SS swapping only.

Referring to FIG. 10, Cell A transmits PSS0 and SSS0 in an SSS0+PSS0 scheme, and Cell B transmits PSS1 and SSS1 in a PSS1+SSS1 scheme, that is, through SS swapping with respect to Cell A. In this case, the receivers of UEs may receive signals due to the timing difference between the cells, as illustrated in FIG. 10. Then false alarm combinations of PSS1+SSS0 and SSS1+PSS0 may be produced.

This false alarm may be overcome by swapping between SSs and defining additional PSS-based scrambling codes for CSG cells. Hereinafter, this is referred to as "option 1" according to the present invention. Option 1 is to combine SS swapping with PSS-based scrambling expressed as [Equation 25].

In another embodiment, PSC-based scrambling codes for CSG cells are applied according to [Equation 21] without further defining 6 PSC-scrambling codes. This scheme is referred to as "option 2" according to the present invention.

Meanwhile, collision may occur when the same PSS-based scrambling code is used for SSSs.

FIG. 11 illustrates collision that may occur when the same PSC-based scrambling code is used for SSSs.

Referring to FIG. 11, Cell A transmits SSS0 and PSS0 sequentially and Cell B transmits PSS0 and SSS0 sequentially. If there is a timing difference between the two cells, the two SSSs SSS0 may collide.

To solve this collision problem, the existing 8 segment 1-based scrambling codes are used for non-CSG cells that transmit SSs in the SSS+PSS scheme, whereas additionally defined 8 segment 1-based scrambling codes are used for CSG cells that transmit SSs in the PSS+SSS scheme in an embodiment of the present invention (option 3). The additional 8 segment-1 based scrambling codes may be generated from the same generator polynomial as creates the existing scrambling codes, but with different cyclic shifts. That is, [Equation 7] and [Equation 24] may be combined.

In another embodiment of the present invention, [Equation 23] and [Equation 24] may be combined, that is, segment 2-based scrambling codes are defined (option 4). In this manner, the problems encountered with FIG. 10 and/or FIG. 11 may be overcome.

Option 1 to option 4 may be used independently or in combination. For instance, option 1 and option 3 may be used in combination. Specifically, SS swapping and PSC-based scrambling may be used together with segment 1-based scrambling. Also, option 1 and option 4 may be used in combination. Specifically, SS swapping and PSC-based scrambling may be used together with segment 2-based scrambling.

Option 2 may be combined with option 3. Specifically, SS swapping, modified PSC-based scrambling described by [Equation 21], and segment 1-based scrambling may be used in combination. Also, option 2 and option 4 may be used in combination. Specifically, SS swapping, modified PSC-based scrambling, and segment 2-based scrambling may be used in combination.

Many other combinations of the above-described options are also possible in the present invention.

4) Method for Increasing Number of Cell IDs through Phase Modulation

In an embodiment of the present invention, a CSG cell ID indicator is defined by phase rotation of an SS.

For example, if a code combination $(m_0, m_1)$ for subframe 0 is (SSC1, SSC2) in a macrocell (interchangeable with a non-CSG cell), a macrocell and a CSG cell may be distinguished from each other by code combinations for subframe 0 and subframe 5. For the sake of convenience, the code combinations will be represented without scrambling.

The code combinations for subframe 0 and subframe are (SSC1, SSC2) and (SSC2, SSC1), respectively in a macrocell.

The code combinations for subframe 0 and subframe 5 are (−SSC1, −SSC2) and (−SSC2, −SSC1), respectively in a CSG cell or an RS.

That is, a macro cell is indicated through phase modulation using (1, 1) and a CSG cell is indicated through phase modulation using (−1, −1).

In another example, a macrocell and a CSG cell may be distinguished as follows.

The code combinations for subframe 0 and subframe 5 are (SSC1, SSC2) and (SSC2, SSC1), respectively in a macrocell.

The code combinations for subframe 0 and subframe 5 are (SSC1, −SSC2) and (SSC2, −SSC1), respectively in a CSG cell or an RS.

That is, a macro cell is indicated through phase modulation using (1, 1) and a CSG cell is indicated through phase modulation using (1, −1).

In a further example, a macrocell and a CSG cell may be distinguished as follows.

The code combinations for subframe 0 and subframe 5 are (SSC1, SSC2) and (SSC2, SSC1), respectively in a macrocell.

The code combinations for subframe 0 and subframe 5 are (SSC1, −SSC2) and (−SSC2, SSC1), respectively in a CSG cell or an RS.

That is, a macro cell is indicated through phase modulation using (1, 1) and a CSG cell is indicated through phase modulation using (−1, 1).

If two or more indicators need to be defined, that is, a CSG cell and an RS cell are to be distinguished, phase modulation may be performed as follows.

The code combinations for subframe 0 and subframe 5 are (SSC1, SSC2) and (SSC2, SSC1), respectively in a macrocell.

The code combinations for subframe 0 and subframe 5 are $(\exp(j\times 2\times pi\times 1/3)\times SSC1, \exp(j\times 2\times pi\times 1/3)\times SSC2)$ and $(\exp(j\times 2\times pi\times 1/3)\times SSC2, \exp(j\times 2\times pi\times 1/3)\times SSC1)$, respectively in a CSG cell.

The code combinations for subframe 0 and subframe 5 are $(\exp(j\times 2\times pi\times 2/3)\times SSC1, \exp(j\times 2\times pi\times 2/3)\times SSC2)$ and $(\exp(j\times 2\times pi\times 2/3)\times SSC2, \exp(j\times 2\times pi\times 2/3)\times SSC1)$, respectively in an RS.

In another example, * the code combinations for subframe 0 and subframe 5 are (SSC1, SSC2) and (SSC2, SSC1), respectively in a macrocell.

The code combinations for subframe 0 and subframe 5 are (SSC1, $\exp(j\times 2\times pi\times 1/3)\times SSC2$) and (SSC2, $\exp(j\times 2\times pi\times 1/3)\times SSC1$), respectively in a CSG cell.

The code combinations for subframe 0 and subframe 5 are (SSC1, $\exp(j\times 2\times pi\times 2/3)\times SSC2$) and (SSC2, $\exp(j\times 2\times pi\times 2/3)\times SSC1$), respectively in an RS.

In a further example, * the code combinations for subframe 0 and subframe 5 are (SSC1, SSC2) and (SSC2, SSC1), respectively in a macrocell.

The code combinations for subframe 0 and subframe 5 are (SSC1, $\exp(j\times 2\times pi\times 1/3)\times SSC2$) and ($\exp(j\times 2\times pi\times 1/3)\times SSC2$, SSC1), respectively in a CSG cell.

The code combinations for subframe 0 and subframe 5 are (SSC1, $\exp(j\times 2\times pi\times 2/3)\times SSC2$) and ($\exp(j\times 2\times pi\times 2/3)\times SSC2$, SSC1), respectively in an RS.

In summary, based on the idea that additional information can be transmitted through SSC phase modulation, a CSG cell is indicated through phase modulation. Phase modulation such as Binary Phase Shift Keying (BPSK) or Quadrature Phase Shift Keying (QPSK) may be performed according to the amount of additional information. Four pieces of information may be additionally transmitted according to phase modulation combinations of SSC1 and SSC2 in BPSK.

The methods according to the embodiments of the present invention as set forth above may be applied to assignment of additional physical cell IDs for CSG cells or reservation of a part of existing physical cell IDs for CSG cells in a 3GPP LTE system. Physical cell IDs can be assigned to added entities in various systems as well as in the 3GPP LTE system. The added entities may include RSs in IEEE systems and physical cell IDs may be MBMS IDs, hot spot indicators, etc.

As is apparent from the above description, additional physical cell ID information can be efficiently transmitted, while minimizing influence on a legacy system. The physical cell ID information may be CSG cell ID information, RS cell ID information, or any other cell ID information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting physical layer cell Identifier (ID) information, the method comprising:
transmitting a Primary Synchronization Signal (PSS) and a Secondary Synchronization Signal (SSS)
wherein a time relationship corresponding to a transmission order between the PSS and the SSS represents the physical layer cell ID information
wherein the physical layer cell ID information corresponds to a Closed Subscriber Group (CSG) cell ID when the SSS is transmitted after the PSS and corresponds to a non-CSG cell ID when the PSS is transmitted after the SSS.

2. The method according to claim 1, wherein the physical layer cell ID information represents cell ID information of a serving cell and service property information of the serving cell, the service property information of the serving cell represents at least one of information indicating whether the serving cell is a Closed Subscriber Group (CSG) cell or a Relay Station (RS) cell, a Multimedia Broadcast Multicast Service (MBMS) indicator, and a hot spot indicator, and the cell ID information of the serving cell represents a whole or part of an ID of the serving cell.

* * * * *